US010674885B2

(12) United States Patent
Bushman et al.

(10) Patent No.: US 10,674,885 B2
(45) Date of Patent: Jun. 9, 2020

(54) ROBOT NAVIGATIONAL SENSOR SYSTEM

(71) Applicant: iRobot Corporation, Bedford, MA (US)

(72) Inventors: Tom Bushman, Marblehead, MA (US); James Herman, Marblehead, MA (US); Seth Blitzblau, Arlington, MA (US); Nathan J. Deschaine, Somerville, MA (US); Andrew Scott Reichel, Watertown, MA (US)

(73) Assignee: iRobot Corporation, Bedford, MA (US)

( * ) Notice: Subject to any disclaimer, the term of this patent is extended or adjusted under 35 U.S.C. 154(b) by 247 days.

(21) Appl. No.: 15/890,791

(22) Filed: Feb. 7, 2018

(65) Prior Publication Data
US 2018/0169863 A1    Jun. 21, 2018

Related U.S. Application Data

(62) Division of application No. 14/789,511, filed on Jul. 1, 2015, now Pat. No. 9,919,425.

(51) Int. Cl.
*G05B 19/04*       (2006.01)
*G05B 19/18*       (2006.01)
(Continued)

(52) U.S. Cl.
CPC .............. *A47L 9/28* (2013.01); *A47L 9/2826* (2013.01); *A47L 9/2852* (2013.01); *G01S 17/93* (2013.01);
(Continued)

(58) Field of Classification Search
CPC ...... A47L 2201/04; A47L 9/28; A47L 9/2826; A47L 9/2852; G01S 17/93; G05D 1/024;
(Continued)

(56) References Cited

U.S. PATENT DOCUMENTS 6,459,955 B1 * 10/2002 Bartsch ..................... A47L 9/00
                                                        700/245
6,594,844 B2    7/2003  Jones
(Continued)

FOREIGN PATENT DOCUMENTS

CN     104245244    12/2014
EP      2623010     8/2013
(Continued)

OTHER PUBLICATIONS

International Search Report and Written Opinion in International Application No. PCT/US2016/040707, dated Sep. 14, 2016, 7 pages.
(Continued)

*Primary Examiner* — Harry Y Oh
(74) *Attorney, Agent, or Firm* — Fish & Richardson P.C.

(57) ABSTRACT

An autonomous robot comprises a robot body, a drive configured to propel the robot, a sensor system disposed on the robot body, and a navigation controller circuit in communication with the drive and the sensor system. The sensor system comprises at least one proximity sensor comprising a sensor body, and a first emitter, a second emitter and a receiver housed by the sensor body, wherein the receiver detects objects in a bounded detection volume of the receiver field of view aimed outward and downward beyond a periphery of the robot body. The receiver is disposed above and between the first and second emitters, the emitters having a twice-reshaped emission beams angled upward to intersect the receiver field of view at a fixed range of distances from the periphery of the robot body to define the bounded detection volume.

20 Claims, 16 Drawing Sheets

(51) Int. Cl.
*A47L 9/28* (2006.01)
*G01S 17/93* (2020.01)
*G05D 1/02* (2020.01)

(52) U.S. Cl.
CPC .......... *G05D 1/024* (2013.01); *A47L 2201/04* (2013.01); *G05D 2201/0215* (2013.01); *Y10S 901/01* (2013.01); *Y10S 901/47* (2013.01)

(58) Field of Classification Search
CPC ........... G05D 2201/0215; Y10S 901/01; Y10S 901/47
See application file for complete search history.

(56) References Cited

U.S. PATENT DOCUMENTS

| | | | |
|---|---|---|---|
| 6,690,134 | B1 | 2/2004 | Jones et al. |
| 6,809,490 | B2 | 10/2004 | Jones et al. |
| 6,883,201 | B2 | 4/2005 | Jones et al. |
| D510,066 | S | 9/2005 | Hickey et al. |
| 6,956,348 | B2 | 10/2005 | Landry et al. |
| 7,024,278 | B2 | 4/2006 | Chiappetta et al. |
| 7,155,308 | B2 | 12/2006 | Jones |
| 7,332,890 | B2 | 2/2008 | Cohen et al. |
| 7,430,455 | B2 | 9/2008 | Casey et al. |
| 7,706,917 | B1 | 4/2010 | Chiappetta et al. |
| 7,720,572 | B2 | 5/2010 | Ziegler et al. |
| 7,957,837 | B2 | 6/2011 | Ziegler et al. |
| 8,087,117 | B2 | 1/2012 | Kapoor et al. |
| 8,195,333 | B2 | 6/2012 | Ziegler et al. |
| 8,386,081 | B2 | 2/2013 | Landry et al. |
| 8,478,442 | B2 | 7/2013 | Casey et al. |
| 8,565,920 | B2 | 10/2013 | Casey et al. |
| 8,761,935 | B2 | 6/2014 | Casey et al. |
| 8,788,092 | B2 | 7/2014 | Casey et al. |
| 8,862,271 | B2 | 10/2014 | Shamlian et al. |
| 9,008,835 | B2 | 4/2015 | Dubrovsky et al. |
| 8,972,052 | B2 | 5/2015 | Chiappetta |
| 9,919,425 | B2 | 3/2018 | Bushman et al. |
| 2002/0016649 | A1 | 2/2002 | Jones |
| 2004/0020000 | A1 | 2/2004 | Jones |
| 2005/0251292 | A1 | 11/2005 | Casey et al. |
| 2006/0087273 | A1* | 4/2006 | Ko .......................... A47L 9/009 318/568.12 |
| 2007/0050086 | A1* | 3/2007 | Lim ..................... G05D 1/0225 700/245 |
| 2007/0192910 | A1 | 8/2007 | Vu et al. |
| 2007/0198128 | A1 | 8/2007 | Ziegler et al. |
| 2007/0199108 | A1 | 8/2007 | Angle et al. |
| 2008/0015738 | A1 | 1/2008 | Casey et al. |
| 2008/0016631 | A1 | 1/2008 | Casey et al. |
| 2009/0045766 | A1 | 2/2009 | Casey et al. |
| 2009/0177323 | A1 | 7/2009 | Ziegler et al. |
| 2009/0228165 | A1 | 9/2009 | Ozick et al. |
| 2009/0292393 | A1 | 11/2009 | Casey et al. |
| 2010/0292884 | A1 | 11/2010 | Neumann et al. |
| 2011/0004339 | A1 | 1/2011 | Ozick et al. |
| 2011/0172822 | A1 | 7/2011 | Ziegler et al. |
| 2012/0303160 | A1 | 11/2012 | Ziegler et al. |
| 2012/0313779 | A1 | 12/2012 | Papaefstathiou et al. |
| 2013/0073088 | A1 | 3/2013 | Lee et al. |
| 2013/0211589 | A1 | 8/2013 | Landry et al. |
| 2013/0226344 | A1 | 8/2013 | Wong et al. |
| 2013/0331990 | A1* | 12/2013 | Jeong .................... G01S 17/936 700/259 |
| 2014/0088761 | A1 | 3/2014 | Shamlian et al. |
| 2014/0095007 | A1 | 4/2014 | Angle et al. |
| 2014/0257622 | A1 | 9/2014 | Shamlian et al. |
| 2014/0313519 | A1 | 10/2014 | Shupunt |
| 2015/0094879 | A1 | 4/2015 | Pari et al. |
| 2015/0362921 | A1* | 12/2015 | Hanaoka ................ G01B 11/24 701/23 |
| 2016/0316982 | A1* | 11/2016 | Kim ..................... A47L 9/2857 |
| 2016/0320777 | A1* | 11/2016 | Yun ...................... G05D 1/0238 |
| 2017/0001311 | A1 | 1/2017 | Bushman et al. |
| 2017/0072564 | A1* | 3/2017 | Cohen .................. A47L 9/2857 |
| 2017/0102709 | A1* | 4/2017 | Kwak ................. A47L 11/4011 |
| 2018/0014709 | A1* | 1/2018 | O'Brien ............... A47L 9/2826 |
| 2018/0249872 | A1* | 9/2018 | Park .................... A47L 9/2826 |
| 2019/0204847 | A1* | 7/2019 | Noh .................... G05D 1/0214 |
| 2019/0212752 | A1* | 7/2019 | Fong .................... A47L 9/2815 |

FOREIGN PATENT DOCUMENTS

| | | |
|---|---|---|
| EP | 2672287 | 12/2013 |
| KR | 1020090019480 | 2/2009 |
| WO | 2007065030 | 6/2007 |

OTHER PUBLICATIONS

Supplementary European Search Report in European 16818890.2, dated Dec. 3, 2018, 7 pages.

* cited by examiner

ROBOT NAVIGATIONAL SENSOR SYSTEM

CROSS-REFERENCE TO RELATED APPLICATIONS

This application is a divisional of and claims priority to U.S. application Ser. No. 14/789,511, filed on Jul. 1, 2015, the entire contents of which are hereby incorporated by reference.

TECHNICAL FIELD

This invention relates to autonomous mobile robots such as floor-cleaning robots, and to proximity sensor systems for navigating such robots across a surface.

BACKGROUND

A vacuum cleaner generally uses an air pump to create a partial vacuum for lifting dust and dirt, usually from floors, and optionally from other surfaces as well. The vacuum cleaner typically collects dirt either in a dust bag or a cyclone for later disposal. Vacuum cleaners, which are used in homes as well as in industry, exist in a variety of sizes and models, such as small battery-operated hand-held devices, domestic central vacuum cleaners, huge stationary industrial appliances that can handle several hundred liters of dust before being emptied, and self-propelled vacuum trucks for recovery of large spills or removal of contaminated soil. These robots have a drive assembly that provides a motive force to autonomously move the cleaning device along a cleaning path.

Autonomous robotic vacuum cleaners generally navigate, under normal operating conditions, a floor surface of a living space while vacuuming the floor. Autonomous robotic vacuum cleaners generally include sensors that allow it to avoid obstacles, such as walls, furniture, or stairs. The robotic vacuum cleaner may alter its drive direction (e.g., turn or back-up) when it bumps into an obstacle. The robotic vacuum cleaner may also alter drive direction or driving pattern upon detecting exceptionally dirty spots on the floor.

Other types of tasks are also performed by robots autonomously navigated across floors and through rooms containing various objects.

Various types of sensing systems have been employed to detect obstacles while the robot is being propelled across a floor. Objects such a robot may encounter include chair and table legs that may be wide or narrow, dark or light.

SUMMARY

In some aspects, the invention features a robot, such as for autonomous cleaning operation, with a proximity sensor that has a generally horizontally-oriented, multi-purpose receiver and two emitters. In some cases the receiver is stacked on top of and centered between the two emitters. The field of view of the receiver intersects (i.e., overlaps) with the fields of view of each of the emitters, in part by the receiver and emitters being directed, in side view, such that their field of view axes intersect in front of the robot. Preferably, the emitters are adjusted from an otherwise diffuse output into a finely aimed beam, such as by passing their emissions through a small aperture and confining them by additional baffling.

In some embodiments, an autonomous robot comprises a robot body defining a forward drive direction, the robot body having a bottom surface and a top surface located at a robot height above a floor surface, a drive configured to propel the robot over a floor surface, a sensor system disposed on the robot body, and a navigation controller circuit in communication with the drive and the sensor system, the controller circuit configured to process a signal received from the sensor system and to control the drive as a function of the processed signal. The sensor system comprises at least one proximity sensor comprising a sensor body, and a first emitter, a second emitter and a receiver housed by the sensor body, wherein the receiver is arranged to detect radiation reflected from objects in a bounded detection volume of the receiver field of view aimed outward and downward beyond a periphery of the robot body. The receiver is disposed above and between the first and second emitters, the first and second emitter having a twice-reshaped emission beams, the twice-reshaped emission beams being angled upward to intersect the receiver field of view at a fixed range of distances from the periphery of the robot body to define the bounded detection volume. The receiver is configured to generate a signal in response to receiving reflected radiation produced by the first and second emitters as the first and second emitters are activated sequentially, and the first and second emitters are spaced from the top surface of the robot body by a distance of less than 35-45% of the robot height, and the receiver is spaced from the top surface of the robot body at a distance of less than 20-35% of the robot height.

In some embodiments, the first and second emitters are arranged side by side and the receiver is centered along a midline between the first and second emitters. An upper bound of the field of view of the receiver is parallel to the floor surface and the twice-reshaped emission beams are angled upward with respect to the floor surface. A lower bound of the twice-reshaped emission beams is angled at about 10 to about 20 degrees with respect to the floor surface. A lower bound of the field of view the receiver is angled downward to intersect the floor surface at a distance from the robot body that is less than 30 percent of the body length. The upper bound of the receiver field of view is angled downward between about 0 and about 15 degrees with respect to the floor surface. The field of view of the receiver subtends an angle on a plane parallel to the floor surface which is greater than an angle on a plane parallel to the floor surface subtended by the twice-reshaped beam of an emitter. The sensor system comprises two or more such proximity sensors. The two or more proximity sensors are arranged laterally in an array across a front of the robot body. Two proximity sensors arranged laterally in the array are separated by a distance of less than 25% of a maximum width of the robot body. A distance from an outermost proximity sensor in the array to a lateral side of the robot body is less than 10% of a maximum width of the robot body. The bounded detection volumes of at least a first portion of the array of proximity sensors are located forward of a front of the robot body, with respect to a non-turning drive direction of the robot. The bounded detection volumes are disposed completely within a distance of approximately 55 mm from the robot body. The bounded detection volumes of a second portion of the array of proximity sensors partially extend beyond a lateral side of the robot body.

In further embodiments, the upper and lower bounds of the twice-reshaped emission beams and the upper and lower bounds of the receiver field of view are determined by respective sets of emission and receiver baffles of the sensor body. At least one emission baffle is a pin point aperture located at an emission source. At least one emission baffle has sharp edges that further define the upper and lower bounds of an emission to form the twice-reshaped emission beam. The set receiver baffles includes a blunt upper baffle edge and angled lower baffle edge that define upper and lower bounds of the receiver field of view. Intersection of the receiver field of view and a first of the twice-reshaped emission beam defines a first bounded detection volume and an intersection of the receiver field of view and a second of the twice-reshaped emission beam defines a second bounded detection volume, the first volume overlapping the second volume at a minimum distance of 2 mm from the robot body.

In further implementations, a proximity sensor system for an autonomous robot, comprises a sensor arranged to respond to presence of objects beyond a perimeter of the robot as the robot moves over a horizontal surface, the sensor comprising a receiver and a set of multiple emitters, and a controller configured to sequentially enable and disable the emitters, wherein the receiver is disposed at a different height than the emitters, and wherein the receiver and the set of emitters are oriented with different beam axis orientations with respect to horizontal, such that a beam of the receiver intersects with the twice-reshaped emission beams of the emitters to define a bounded detection volume disposed within a distance of about 2 to about 55 mm from the periphery of the robot.

In further embodiments, the controller sequentially enables and disables each of the emitters such that only one of the emitters is actuated at one time. The controller issues a direction-changing drive command in response to an object interfering with the bounded detection volume. The controller issues a speed-changing drive command in response to an object interfering with the bounded detection volume. The sensor further comprises a sensor body having at least two baffles arranged to limit the beam of at least one of the emitters or detector.

In further implementation, an autonomous robot comprises a robot body defining a forward drive direction, the robot body having a bottom surface and a top surface located at a robot height above a floor surface, a drive configured to propel the robot over a floor surface, a sensor system disposed on the robot body, and a navigation controller circuit in communication with the drive and the sensor system, the controller circuit configured to process a signal received from the sensor system and to control the drive as a function of the processed signal. The sensor system comprises at least one proximity sensor comprising a sensor body, and a first emitter, a second emitter and a receiver housed by the sensor body, wherein the receiver is arranged to detect radiation reflected from objects in a receiver field of view. The receiver is disposed above and between the first and second emitters, each emitter having a twice-reshaped emission beam, each twice-reshaped emission beam being angled upward to intersect the receiver field of view at a fixed range of distances from the robot body. The receiver is configured to generate a signal in response to receiving reflected radiation produced by the first and second emitters as the first and second emitters are activated sequentially. The twice-shaped emission beams include a minimum height within 35-45% of the robot height measured from the top surface of the robot body, and the receiver field of view includes a maximum height of 20-35% of the robot height measured from the top surface of the robot body.

Implementations of the concepts described herein can be particularly useful in the detection of small, relatively dark-colored objects a robot is approaching, with greater accuracy than has been experienced with some other detection methods. Thus, robots can be configured to detect the presence of such dark-colored, narrow obstacles (such as some table legs) at a more predictable distance in front of the robot, to resolve the position of detected objects with greater resolution, and to detect dark-colored and small objects that may previously not have been as easily detectable. The ability to detect such objects before the robot makes physical contact with the object allows the robot time to slow its forward speed and so be able to lightly touch the object so as to not cause damage to sensitive objects, for example. The sensors described herein can be constructed to be compact and suitable for use on a robot with a flat front profile. Additionally, the sensor can be equipped with an additional detector responsive, for example, to infrared (IR) emissions, and arranged to have an unobstructed view ahead of the robot for detecting emissions from accessory devices. The overall responsive field of view of the sensors can be set to allow the robot to sense objects located directly in front of (i.e., along a fore-aft axis) of the robot, as well to the sides of the robot (i.e., extending along a transverse axis of the robot). These advantages are particularly realized for robots having a square-front profile, as early detection of obstacles can allow the robot to avoid becoming stuck (e.g., a square front robot stuck in a narrow passage and unable to rotate).

The robots, or operational aspects thereof, described herein can be implemented as/controlled by a computer program product that includes instructions that are stored on one or more non-transitory machine-readable storage media, and that are executable on one or more processing devices to control (e.g., to coordinate) the operations described herein. The robots, or operational aspects thereof, described herein can be implemented as part of a system or method that can include one or more processing devices and memory to store executable instructions to implement various operations.

The details of one or more embodiments of the invention are set forth in the accompanying drawings and the description below. Other features, objects, and advantages of the invention will be apparent from the description and drawings, and from the claims.

DETAILED DESCRIPTION

Robot Description

Figure 1A:
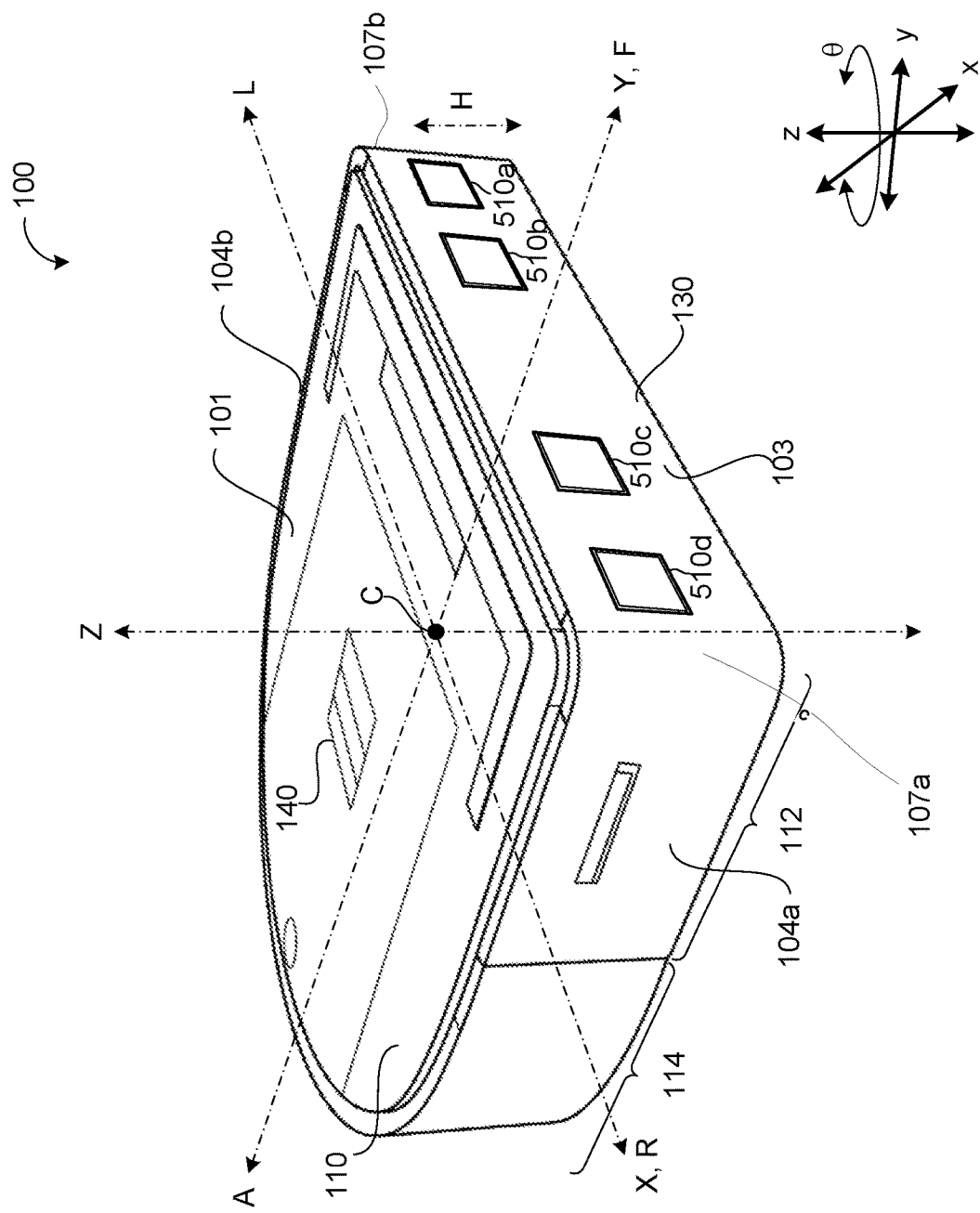
FIG. 1A is a perspective view of an exemplary cleaning robot.
Figure 1B:
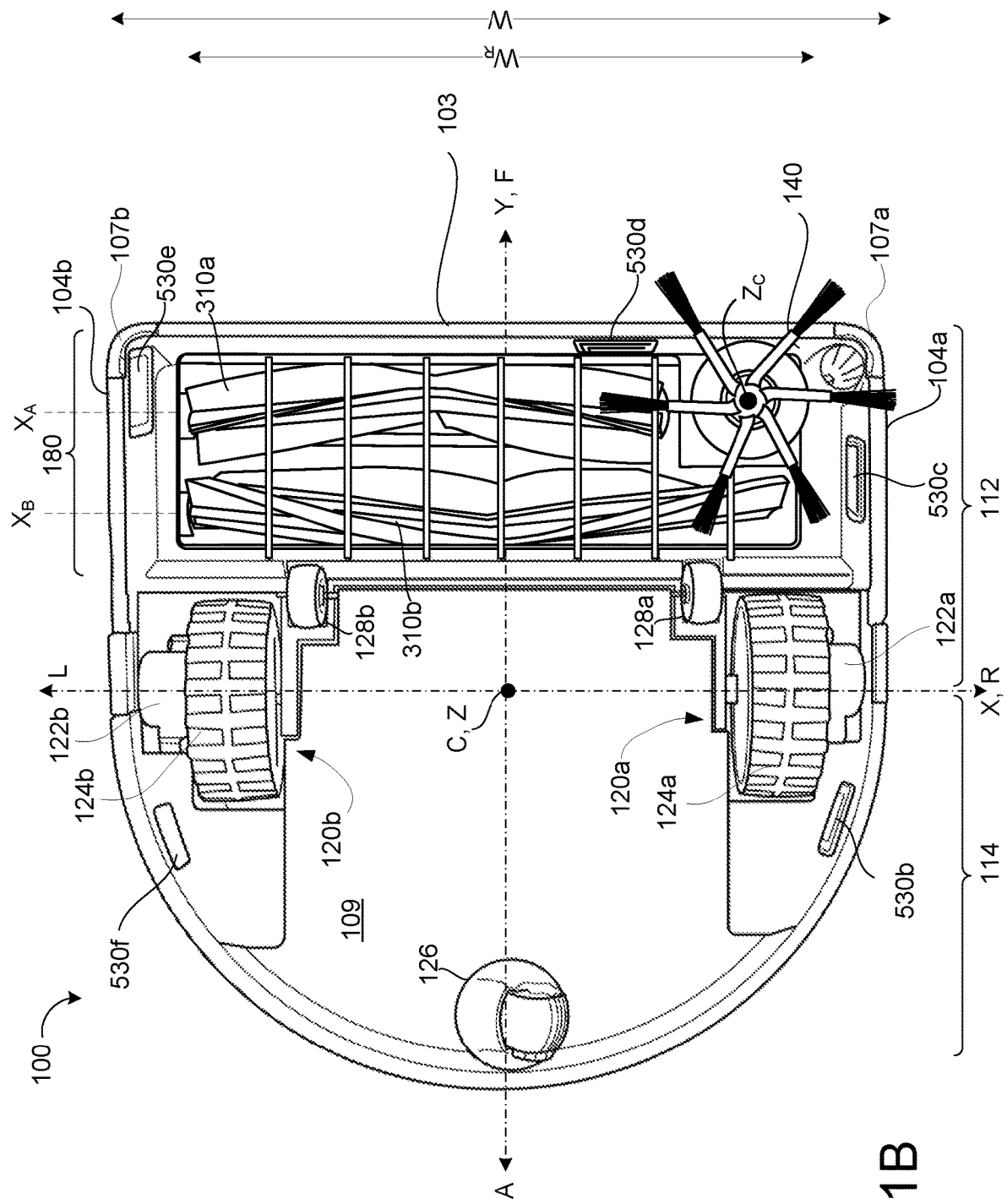
FIG. 1B is bottom view of the robot shown in FIG. 1A.

FIGS. 1A-B show perspective and bottom views, respectively, of an autonomous robot cleaner 100. In implementations, the robot 100 has a square front and rounded back, or "tombstone" shape. In other implementations, the robot 100 is polygonal, hexagonal, circular, semi-circular, triangular, reuleaux triangular, spline shaped, or has any other appropriate shape. Referring to FIG. 1A, the robot 100 includes a body 110, a top surface 101, a forward portion 112, and a rearward portion 114. The robot 100 can move across a floor surface through various combinations of movements relative to three mutually perpendicular axes defined by the body 110 being a transverse axis X, a fore-aft axis Y, and a central vertical axis Z. A forward drive direction along the fore-aft axis Y is designated F (referred to hereinafter as "forward"), and an aft drive direction along the fore-aft axis Y is designated A (referred to hereinafter as "rearward"). The transverse axis X extends between a right side R and a left side L of the robot 100 substantially along an axis defined by center points of the wheel modules 120a, 120b (shown in FIG. 1B). The forward portion 112 has a front surface 103 that is generally perpendicular to side surfaces 104a,b of the robot 100. Referring briefly to both FIGS. 1A and 1B, rounded surfaces or corners 107a,b connect the front surface 103 to the side surfaces 104a,b. The front surface 103 is at least 90% of the width of the robot body. The rearward portion 114 is generally rounded, having a semicircular cross section. A user interface 140 disposed on a part of the top surface 101 of the body 110 receives one or more user commands and/or displays a status of the robot 100.

Proximity sensors 510a-d disposed on the forward portion 112 detect the presence of obstacles near the front of the robot 100, e.g., near the front and sides of the robot body 110. The forward portion 112 of the body 110 further carries a bumper 130, which detects (e.g., via one or more sensors) obstacles in a drive path of the robot 100. For example, as shown in FIG. 1B, which depicts a bottom view of the robot 100, as the wheel modules 120a, 120b propel the robot 100 across the floor surface during a cleaning routine, the robot 100 may respond to events (e.g., collision with obstacles, walls, detection of objects near the front and sides of robot 100) detected by the bumper 130 and/or proximity sensors 510a-d by controlling the wheel modules 120a, 120b to maneuver the robot 100 in response to the event (for example, changing the forward speed of the robot 100 or changing the heading of the robot 100 away from the obstacle).

Still referring to FIG. 1B, the bottom surface of the forward portion 112 of the robot 100 further includes a cleaning head 180, a side brush 140, wheel modules 120a,b, a caster wheel 126, clearance regulators 128a,b, and cliff sensors 530b. The cleaning head 180, disposed on the forward portion 112, receives a front roller 310a which rotates about an axis $X_A$ and a rear roller 310b which rotates about an axis $X_B$. Both axes $X_A$ and $X_B$ are substantially parallel to the axis X. The front roller 310a and rear roller 310b rotate in opposite directions with the rear roller 310b rotating in a counterclockwise sense and the front roller 310a in a clockwise sense. The rollers 310a,b are releasably attached to the cleaning head 180. The robot body 110 includes the side brush 140 disposed on the bottom forward portion 112 of the robot body 110. The side brush 140 axis $Z_C$ is offset along the axes X and Y of the robot such that it sits on a lateral side of the forward portion 112 of the body 110. The side brush 140, in use, rotates and sweeps an area directly beneath one of the cliff sensors 530b. The front roller 310a and the rear roller 310b cooperate with the side brush 140 to ingest debris. The side brush axis $Z_C$ is disposed forward of both the front roller axis $X_A$ and the rear roller axis $X_B$.

Wheel modules 120a, 120b are substantially opposed along the transverse axis X and include respective drive motors 122a, 122b driving respective wheels 124a, 124b. Forward drive of the wheel modules 120a,b generally induces a motion of the robot 100 in the forward direction F, while back drive of the wheel modules 120 generally produces a motion of the robot 100 in the rearward direction A. The drive motors 122a,b are releasably connected to the body 110 (e.g., via fasteners or tool-less connections) with the drive motors 122a,b positioned substantially over the respective wheels 124a,b. The wheel modules 120a,b are releasably attached to the body 110 and forced into engagement with the floor surface by respective springs. The robot 100 weighs between about 10 and 60 N empty. The robot 100 has most of its weight over the drive wheels 124a,b to ensure good traction and mobility on surfaces. The caster 126 disposed on the rearward portion 114 of the robot body 110 can support between about 0-25% of the weight of the robot. The clearance regulators 128a,b maintain a minimum clearance height (e.g., at least 2 mm) between the bottom surface 109 of the body 110 and the floor surface and support between about 0-25% of the weight of the robot and ensure the forward portion 112 of the robot 100 does not sit on the ground when the robot 100 accelerates.

The robot 100 includes multiple cliff sensors 530b-f located near the forward and rear edges of the robot body 110. Cliff sensors 530c, 530d, and 530e are located on the forward portion 112 near the front surface 103 of the robot and cliff sensors 530b and 530f are located on a rearward portion 114. Each cliff sensor is disposed near one of the side surfaces so that the robot 100 can detect an incoming drop or cliff from either side of its body 110. Each cliff sensor 530b-f emits radiation, e.g. infrared light, and detects a reflection of the radiation to determine the distance from the cliff sensor 530b-f to the surface below the cliff sensor 530b-f. A distance larger than the expected clearance between the floor and the cliff sensor 530b-f, e.g. greater than 2 mm, indicates that the cliff sensor 530b-f has detected a cliff-like feature in the floor topography.

The cliff sensors 530c, 530d, and 530e located on the forward portion 112 of the robot are positioned to detect an incoming drop or cliff from either side of its body 110 as the robot moves in the forward direction F or as the robot turns. Thus, the cliff sensors 530c, 530d, and 530e are positioned near the front right and front left corners (e.g., near the rounded surfaces 107a,b connect the front surface 103 to the side surfaces 104a,b). Cliff sensor 530e is positioned within about 1-5 mm of the rounded surface 107b. Cliff sensors 530c and 530d are each positioned between least 10 mm and 40 mm from the corner of the robot 100 (e.g., rounded surface 107a). The cliff sensors 530c and 530d are positioned near the side brush 140 such that the side brush 140, in use, rotates and sweeps an area directly beneath cliff sensors 530c and 530d.

Figure 1C:
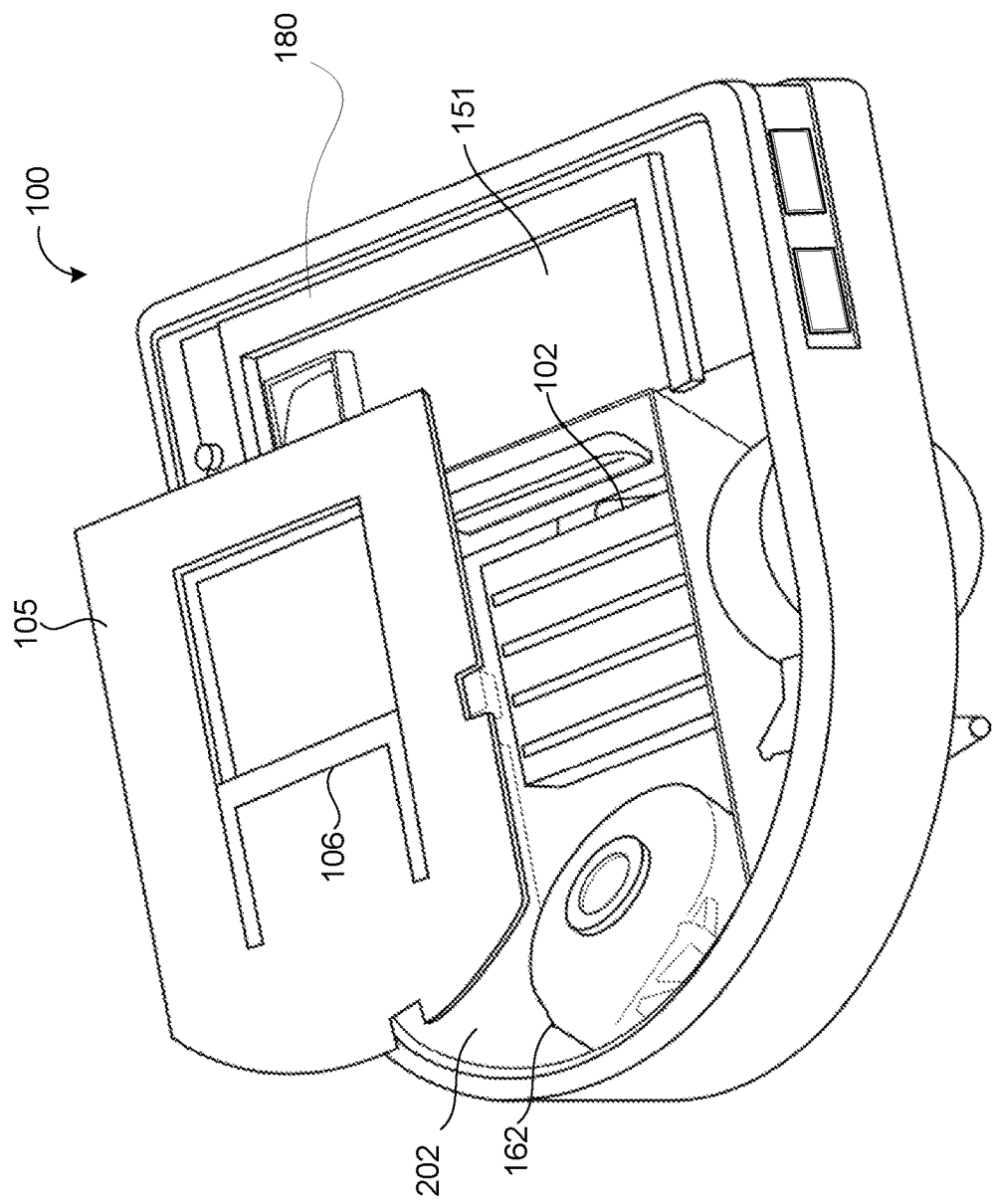
FIG. 1C is a perspective view of the robot shown in FIG. 1A with a removable top cover detached from the robot.

FIG. 1C shows a perspective view of a version of the robot 100 with a removable top cover 105. The robot body 110 supports a power source 102 (e.g., a battery) for powering any electrical components of the robot 100, and a vacuum module 162 for generating vacuum airflow to deposit debris into a dust bin (not shown). A handle 106 can be used to release the removable top cover to provide access to the dust bin. Releasing the removable top cover also allows access to a release mechanism for the cleaning head 180, which is releasably connected to the robot body 110. A user can remove the dust bin 202 and/or the cleaning head 180 to clean any accumulated dirt or debris. Rather than requiring significant disassembly of the robot 100 for cleaning, a user can remove the cleaning head 180 (e.g., by releasing tool-less connectors or fasteners) and empty the dust bin 202 by grabbing and pulling the handle 106. The robot 100 further supports a robot controller 151. Generally, the controller 151 operates electromechanical components of the robot 100, such as the user interface 140, the wheel modules 120a,b, and the sensors 530 (shown in FIGS. 1A-B).

Figure 2:
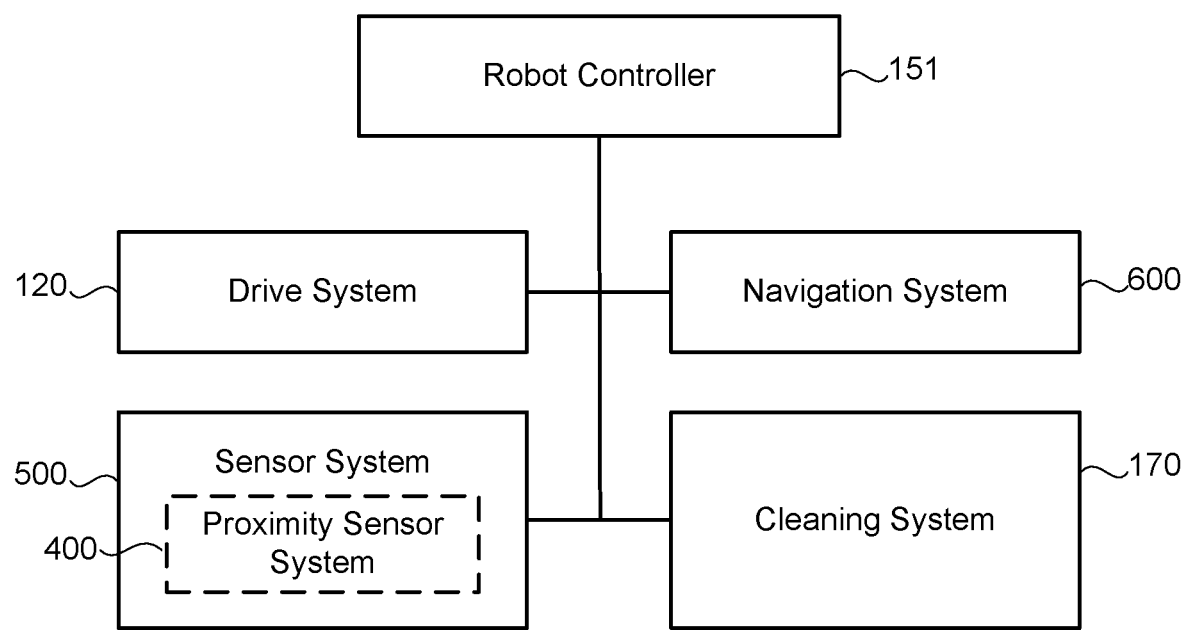
FIG. 2 is a block diagram of a controller of the robot and systems of the robot operable with the controller.

Referring to FIG. 2, the robot controller 151 operates a cleaning system 170, a sensor system 500, a drive system 120, and a navigation system 600. The cleaning system 170 is configured to ingest debris with use of the rollers 310, the side brush 140, and the vacuum module 162.

The sensor system 500 has several different types of sensors which can be used in conjunction with one another to create a perception of the environment sufficient to allow the robot 100 to make intelligent decisions about actions to take in that environment. The sensor system 500 can include obstacle detection obstacle avoidance (ODOA) sensors, communication sensors, navigation sensors, contact sensors, a laser scanner, an imaging sonar, etc. Referring briefly to FIGS. 1A-B, the sensor system 500 of robot 100 includes cliff sensors 530, clearance sensors operable with the clearance regulators 128a,b, contact sensors operable with the caster wheel 126, and a proximity sensor system 400 with proximity sensors 510 (including sensors 510a-d), that detects when the robot 100 is near an obstacle. Additionally or alternatively, the sensor system 500 may include other proximity sensors, sonar, radar, LIDAR (Light Detection And Ranging, which can entail optical remote sensing that measures properties of scattered light to find range and/or other information of a distant target), etc., infrared cliff sensors, contact sensors, a camera (e.g., volumetric point cloud imaging, three-dimensional (3D) imaging or depth map sensors, visible light camera and/or infrared camera), etc.

Referring also to FIGS. 1A and 1B, the drive system 120, which includes wheel modules 120a,b, can maneuver the robot 100 across the floor surface based on a drive command having x, y, and θ components. The controller 151 operates a navigation system 600 configured to maneuver the robot 100 in a pseudo-random pattern across the floor surface. The navigation system 600 is a behavior-based system stored and/or executed on the robot controller 151. The navigation system 600 receives input from the sensor system 500 and determines and issues drive commands to the drive system 120.

The controller 151 (executing a control system) is configured to cause the robot to execute behaviors, such as docking with a base station, maneuvering in a wall-following manner, a floor-sweeping manner, or changing its direction of travel when an obstacle is detected by, for example, the proximity sensor system 400. The controller 151 can redirect the wheel modules 120a, 120b in response to signals received from the sensors of sensor system 500, causing the robot 100 to avoid obstacles and clutter while treating the floor surface. If the robot 100 becomes stuck or entangled during use, the robot controller 151 may direct the wheel modules 120a, 120b through a series of escape behaviors so that the robot 100 can escape and resume normal cleaning operations.

The robot controller 151 can maneuver the robot 100 in any direction across the floor surface by independently controlling the rotational speed and direction of each wheel module 120a, 120b. For example, the robot controller 151 can maneuver the robot 100 in the forward F, rearward A, right R, and left L directions. As the robot 100 moves substantially along the fore-aft axis Y, the robot 100 can make repeated alternating right and left turns such that the robot 100 rotates back and forth around the center vertical axis Z (hereinafter referred to as a wiggle motion). Moreover, the wiggle motion can be used by the robot controller 151 to detect robot stasis. Additionally or alternatively, the robot controller 151 can maneuver the robot 100 to rotate substantially in place such that the robot 100 can maneuver away from an obstacle, for example. The robot controller 151 can direct the robot 100 over a substantially random (e.g., pseudo-random) path while traversing the floor surface.

Sensor Geometry

Referring to FIG. 1A, in one implementation, proximity sensors 510a-d disposed on a square front or "tombstone" shaped robot 100 use IR sensing, which operate on the principle of overlapping emission reflection and receiver detection zones. Each sensor 510a-d includes an emitter that broadcasts a cone of light, or emission beam, into the environment at a region of interest (such as near the front and lateral sides of the robot during its forward direction of motion), and a detector that receives light from an emission reflecting off of an object in the path of the robot 100. The cones of emission beams and receiver field of view are arranged to intersect each other and only if an object is in the intersection zone of the two cones will the sensor respond and detect the object. The zone of intersection of two cones is roughly clam shaped, or ovoid. Increasing the angle between the emitter and sensor central axes increases the width of the clam and hence the detection/overlap/intersection zone.

Figure 3A:
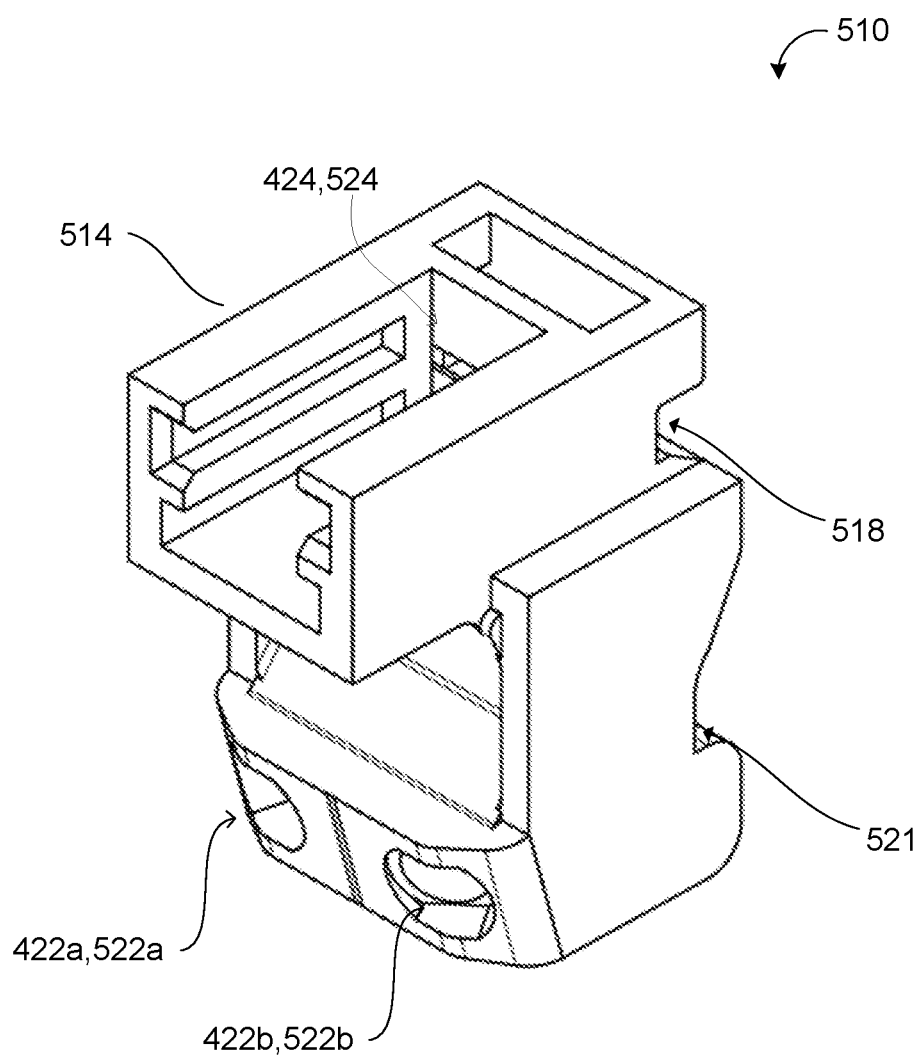
FIG. 3A is a perspective view of sensor baffle housing for a proximity sensor of the robot in FIG. 1A.
Figure 4A:
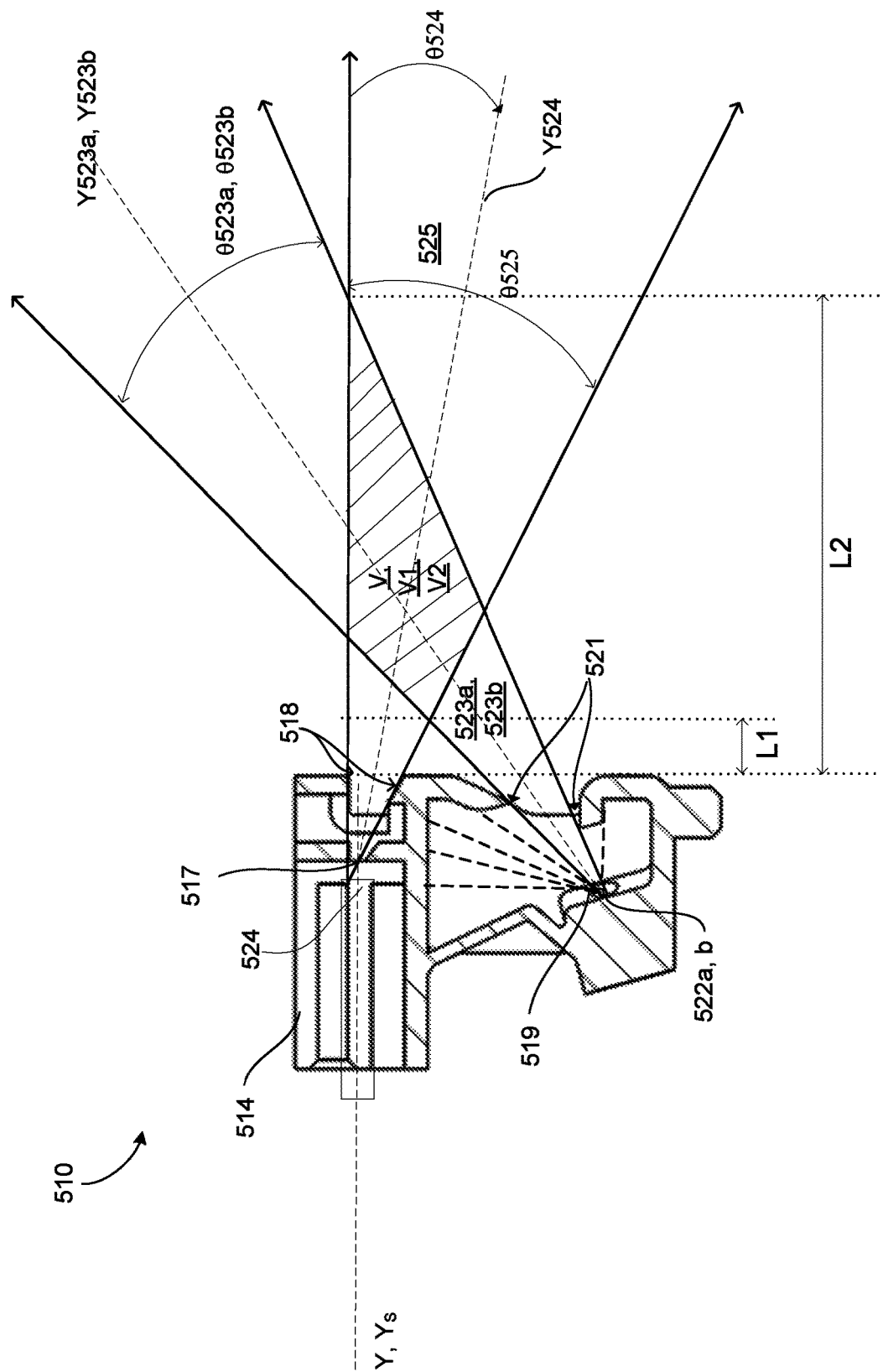
FIG. 4A is a side view of the proximity sensor showing fields of emission and detection for the proximity sensor.

Object detection near the front surface 103 of the robot 100 is implemented using the proximity sensors 510a-d of the proximity sensor system 400 that operate on this principle. Referring also to FIGS. 3A and 4A, each proximity sensor 510a-d uses infrared emitters 522a,b and an infrared detector or receiver 524 angled toward each other so as to have overlapping emission beams and detection field, and hence a bounded detection volume V positioned to span a range of predetermined distances away from of the robot body 110. The predetermined distance can include distances between 2-55 mm. By tuning the bounds of the detection volume V within particular near and far distances beyond the perimeter of the robot body 110, the robot 100 is able to sense small dark objects and large light colored objects simultaneously and respond to each condition in time to avoid a collision. The range of predetermined distances is determined in part by the mechanically altered geometries of the receiver detection field and the emission beams. The emission beams, rather than radiating unbounded from emitters, are twice-reshaped and redirected, and the detection zone is similarly reshaped to detect both small dark objects near the robot and large light colored objects spaced apart from the robot at a greater distance. The twice-reshaped emission beams and reshaped receiver detection field of view determine the geometry and placement of resulting bounded detection volume V of the sensor 510 relative to the robot body 110. The twice reshaped emission beams and the reshaped detection field of the receiver in combination define the near and far boundaries of the resulting detection zone V, thereby determining the closest and furthest distances at which an object can be detected.

The sensors 510 described herein have a broad field of view of a total bounded detection volume V shaped and delineated by two horizontally overlapping bounded detections volumes V1, V2. In implementations, the robot 100 includes an array of sensors 510 having bounded detection volumes V that, in a top down view, are oriented horizontally across the front and around the corners 107a,b of the robot 100. The sensors 510 include a single receiver 524 paired with two emitters 522a,b and are configured such that the two emitters 522a,b are positioned at a different elevation than the receiver 524 along the height of the robot 100. In implementations, the emitters 522a,b are disposed on the sensor 510 below the receiver 524, and the receiver 524 is disposed along a midline between the two emitters 522a,b. In other implementations, the vertical orientation of the receiver 524 and emitters 522a,b may be reversed, and in still other implementations, the receiver may be offset from the midline between the emitters 522a,b. Offsetting the receiver would alter the geometry of the bounded detection volume V defined by the overlapping emission beams 523a,b and receiver field of view 524. In implementations, the receiver 524 is disposed at a height less than 20-30% of the overall height of the robot 100 and the emitters 522a,b are disposed at a height less than 35-45% of the overall height of the robot 100.

The vertical orientation of the receiver 524 atop a pair of emitters 522a,b in combination with baffling on the sensor 510 housing controls the geometry and placement of the bounded detection volume V relative to the front and corners 107a,b of the robot 100. The vertical orientation of the receiver 524 atop a pair of emitters 522a,b produces horizontally elongated clamshell-shaped detection zones that provide continuous, overlapping coverage of bounded detection volumes V of the array of proximity sensors 510 disposed across the front surface 103 of the robot 100. Furthermore, the horizontal clamshell-shaped detection volumes V at the outermost ends of the array of proximity sensors allow the robot 100 to detect objects in a region around the front corners, e.g. the rounded surfaces 107a,b, of the flat-front robot 100 of FIG. 1A. This provides the robot 100 with obstacle detection at its widest point and allows the robot 100 to detect whether an object aside one or both corners 107a,b, is a small post or a solid wall that would prevent the robot 100 from turning in place.

Additionally, the vertical arrangement of a receiver 524 atop emitters combined with the sensor body 514 geometry aiming a top boundary of the receiver 524 outward at a nearly horizontal angle places the receiver field of view at a height and orientation that enables a dual function of also detecting of emissions from remote peripheral devices, such as docking stations and/or confinement beam emitters. The receivers 524 therefore perform a dual function of navigation and peripheral detection without extending above the top surface 101 of the robot 100. The robot 100 therefore has a height envelope short enough to pass under furniture and fixtures, such as couches and cabinet overhangs, for example, without a single raised feature on the top surface 101 impeding movement. The dual purpose receiver thus allows the robot 100 to navigate and detect obstacles as well as to detect peripherals with a single array of sensors 510 and receivers 524. An omnidirectional raised sensor on the highest point of the robot can detect 360 degrees around the robot, but the effectively raised height of a robot with an omnidirectional sensor limits the cleaning areas to those with clearance higher than the highest point of the robot. To eliminate this raised element but still detect peripheral emissions around the entire robot 100, in one implementation, the robot 100 further comprises a plurality of receivers 524 disposed around the perimeter of the robot 100 such that the fields of view of the receivers overlap for full perimeter detection (see FIG. 7). In such an implementation, the dual purpose receiver 524 in the array of sensors 510 at the front 103 to the robot 100 in combination with similar standalone receivers 524 placed around the robot body 110, eliminates the need for an omnidirectional raised sensor, reducing the overall height envelope of the robot 100 to the top surface 101. By substantially horizontally aligning the upper boundary of a receiver field of view 525 of the proximity sensor 510 used in conjunction with the emitters 522a,b described herein, the sensor system 500 serves the dual purpose of detecting stationary objects and sensing peripheral emissions that alter the behavior of the robot 100.

The geometry, orientation and position (relative to the robot body 110) of the receiver field of view 525 and emission beams 523a,b are defined by the shape of the sensor body 514. Referring to FIGS. 3A-B and 4A-E, in one implementation, the proximity sensor 510 includes a sensor body 514 housing a receiver 524 and first and second emitters 522a,b. The sensor body 514 is sized and shaped with a recess 424 that engages with the receiver 524, and two recesses 422a,b that are sized and shaped to engage with first and second emitters 522a, 522b. The emitters 522a,b are adjacent to and centered on the same horizontal plane with respect to one another, being spaced along the transverse axis X of the robot 100. The receiver 524 is disposed vertically from the emitters 522a,b at a midline between the first emitter 522a and the second emitter 522b. That is, the receiver 524 is displaced from the emitters 522a,b along the vertical axis Z of the robot 100 when the sensor 510 is assembled on the robot body 110. The receiver 524 has a receiver field of view 525, and each of the emitters 522a, 522b has a respective emission beam, or emitter field of view 523a, 523b. The receiver field of view 525 intersects the first emission beam 523a of the first emitter 522a and defines a first bounded detection volume V1. In addition, the receiver field of view 525 intersects the second emission beam 523b of the second emitter 522b, defining a second bounded detection volume V2. The first bounded detection volume V1 and the second bounded detection volume V2 therefore define two regions of overlap the receiver field of view 525 to define an bounded detection volume V for obstacle detection just beyond the perimeter of the robot 100, the bounded detection volume V having the shape of a horizontally elongated and downwardly angled clamshell having illumination from two different sources, the first and second emitters 522a,b.

Figure 5A:
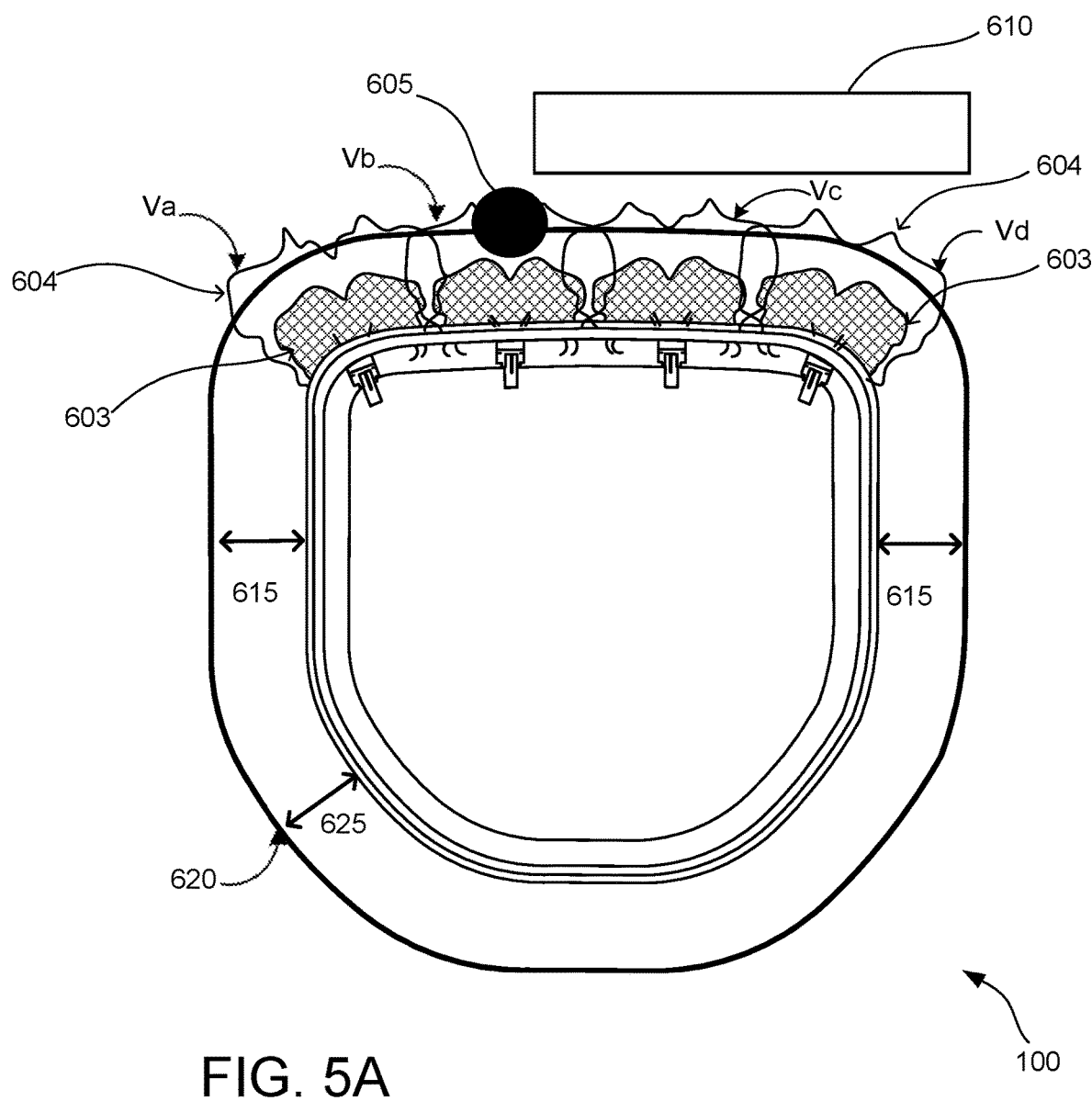
FIGS. 5A-B are schematic top views of the exemplary cleaning robot showing multiple sensors across the front of the robot.

By orienting the receiver 524 and emitters 522a,b in-line vertically, the bounded detection volume V of the sensor 510 is larger in a horizontal dimension than a sensor having a receiver in-line horizontally with an emitter. This is particularly useful on a square-front robot 100 because the emissions of a plurality of vertically oriented sensors spaced across the front covers the entire horizontal width of the robot 100 as well as a region around and beyond the corners 107a,b of the front 103 of the robot 100. The overlapping array of bounded detection volumes V therefore improves detection across the front 103 and around the corners 107a,b of the robot 100. This overlapping array of bounded detection volumes V is particularly advantageous for a square front robot 100, allowing the robot 100 to avoid travelling into a narrow passageway that would prevent the robot 100 from turning in place. Unlike a round-profile robot which is symmetric and presents the same perimeter at all orientations as the round-profile robot turns, a square-front robot 100 has corners which extend beyond the circular profile of the back of the robot. Referring to FIG. 5A, the rounded surfaces 107a,b of the corners of the robot 100 need sufficient clearance to turn as the robot body 110 rotates in place. Having overlapping bounded detection volumes V that extend a distance 615 beyond the sides of the robot body 110 insures that the robot 100 can detect if an object is a post easily navigated around or a larger obstacle that would prevent turning in place. The robot 100 is, therefore, able to determine whether there is sufficient clearance on either side of the robot to enable turning.

In some implementations, the emitters 522a,b provide equal illumination power, and the robot 100 modulates emissions in the time domain, alternately firing on emitter 522a,b as it turns the other emitter 522a,b off so the bounded detection volume V shifts from left to right, or vice versa, relative to the position of the receiver field of view 525. Each sensor 510 thus detects a total bounded detection volume V which includes overlapping but sequentially activated bounded detection volumes V1 and V2 that in combination, span the full horizontal spread of effective receiver field of view 525 as bounded by the sensor body 514. The emitters 522a,b will fire in an alternating sequence, blinking such that a processor on the robot 100 will process detected light reflections at least at a rate of 1 ms per sensor, a rate which will enable the robot 100 to respond in time to a detected obstacle and by slow the rate of travel and preventing the bumper 130 from contacting the obstacle at full speed and force.

The sequential firing of the emitters 522a,b allows the bounded detection volume V to detect obstacles in a substantial portion of the region just beyond the front surface 103 and corners 107a,b of the robot while still providing high spatial resolution as the robot 100 can distinguish between close dark colored objects and large light colored objects in either volume V1 and V2. Referring to FIG. 5A, activating the emitters 522a,b in sequence allows the robot 100 to detect the location of dark-colored objects 605 within a first region 603 closer to the robot 100 as well as light-colored objects 610 in a second region 604 further from the robot 100 than the first region 603, but still within a short distance (e.g., less than 3 inches). This result is achieved by baffling the sequentially fired emission beams 523a,b to control their size and shape and setting the received radiation threshold on the receiver 524 to a low enough value that a higher percentage of emitted light reflects back from the small dark, light absorbing objects 605 as well as from highly reflective lighter surfaces 610 within a region very close (e.g. less than 3 inches, and preferably less than 2 inches) to the perimeter of the robot 100. In implementations, the detected power ratio (of light received versus light emitted) is between 1E−9 and 1E−8, or 1-10 parts per billion. In implementations the detected power is between 10 and 100 parts per billion. In implementations, the emitter efficiency is 35 mW/100 mA, the emitter current is 150 mA, the emitter power is 52.5 mW, the receiver efficiency is 3 uA/mW/cm$^2$, the receiver area is 0.23 mm2, the receiver threshold voltage is 100 mV, the transimpedance gain is 8.00E+08V/A, the receiver threshold current is 1.25E−10A, the receiver threshold power is 9.58E−08 mW and the detected power ratio is 1.83E−09.

If the emitters were fired in tandem (or if there was a single wider angle emitter), more light would be reflected back from a large, light-colored surface than necessary to detect that high reflective item, and this increased radiation would be much greater than the low threshold needed to detect a small percentage value of returned reflection from a small dark colored close object. The robot 100 would then sense this increased power value of reflected light from the light colored object and determine the object as being closer to the robot 100 than it is. The robot 100 would slow to avoid collision far too soon in this case and would extend mission duration and decrease cleaning efficiency. Therefore, by lowering the threshold of received radiation necessary for determining the presence of an obstacle to a value that enables detecting small, dark colored, light absorptive surfaces, such as dark chair legs and table legs, and by sequentially firing the emitters 522a,b, such that only one light source at a time is illuminating a portion of the bounded detection volume V, a large light colored obstacle (e.g. a wall, a large piece of furniture, a cabinet, etc.) only reflects back a necessary amount of light for the robot 100 to detect the presence of the obstacle at a close distance. The sensor 510 of the present invention therefore is tuned to detect both small dark and light colored objects close to the robot 100 so that the response of slowing down before making contact or slowing down and avoiding contact happens close to the object (e.g. closer than 3 inches, and preferably closer than 2 inches).

The bounded detection volumes V1, V2 defined by the emission beams 523a,b are confined, using baffling as described in detail below to achieve obstacle detection at a range of 2-55 mm from the periphery of the robot 100. The first and second bounded detection volumes V1, V2 extend (in a robot of about 20-40 cm width and wheel diameter of about 3-8 cm) away from the robot 100 to approximately about 2 mm to approximately 5 cm beyond the perimeter of the robot body 110.

The sensor 510 is disposed behind the front surface 103 and near the top surface 101 of the robot body 110. When placed on the floor 10, the robot has an overall height H1 from the floor 10 to the top surface 101, and a robot body height H2 from a bottom surface 109 of the robot to the top surface 101 of the robot body 110. The sensor is oriented with the receiver 524 above the emitters 522a,b such that the receiver 524 can detect an emission at a height (see FIG. 3B) above the floor surface compatible with peripheral signal detection. For example, the sensor 510 can be located in the top 50% of the robot body 110, or top 55% of the overall height H1 of the robot 100 as measured from the top surface 101 of the robot 100 to the floor surface 10. In one implementation, the receiver 524 is located such that its field of view 525 includes height H, and the receiver is located within the top 20-35% of the robot body height H2, (e.g., 22%, 24%, 26%, 28%, 30%, 33%). In one implementation, the receiver is located within 20-30% of the overall height H1 of the robot 100 (e.g., 21, 23, 25%, 27%).

In implementations, the emitters 522a,b are located within the top 40-50% of the robot body height H2 (e.g., 41%, 43%, 45%, 47%) and preferably are within the top 35-45% of the overall height H1 (e.g., 37%, 39%, 40%, 41%, 43%).

For example, in one implementation a robot 100 with robot body height H2 of 79 mm and overall height H1 of 86 mm, the proximity sensor 510 is located so that the receiver is approximately 22 mm (e.g., 21.88 mm) from the top surface 101 of the robot, or within the top 28% of the robot body height H2 (e.g., 27.6%) and approximately 25% of the overall height H1 of the robot 100 (e.g., 25.4%). The emitters 522a,b are approximately 35 mm (e.g., 34.38 mm) from the top surface 101 of the robot body 510, within 45% of the robot body height H2 (e.g., 43.5%) and 40% of the overall height H1 of the robot 100 (e.g., 39.9%).

Figure 4B:
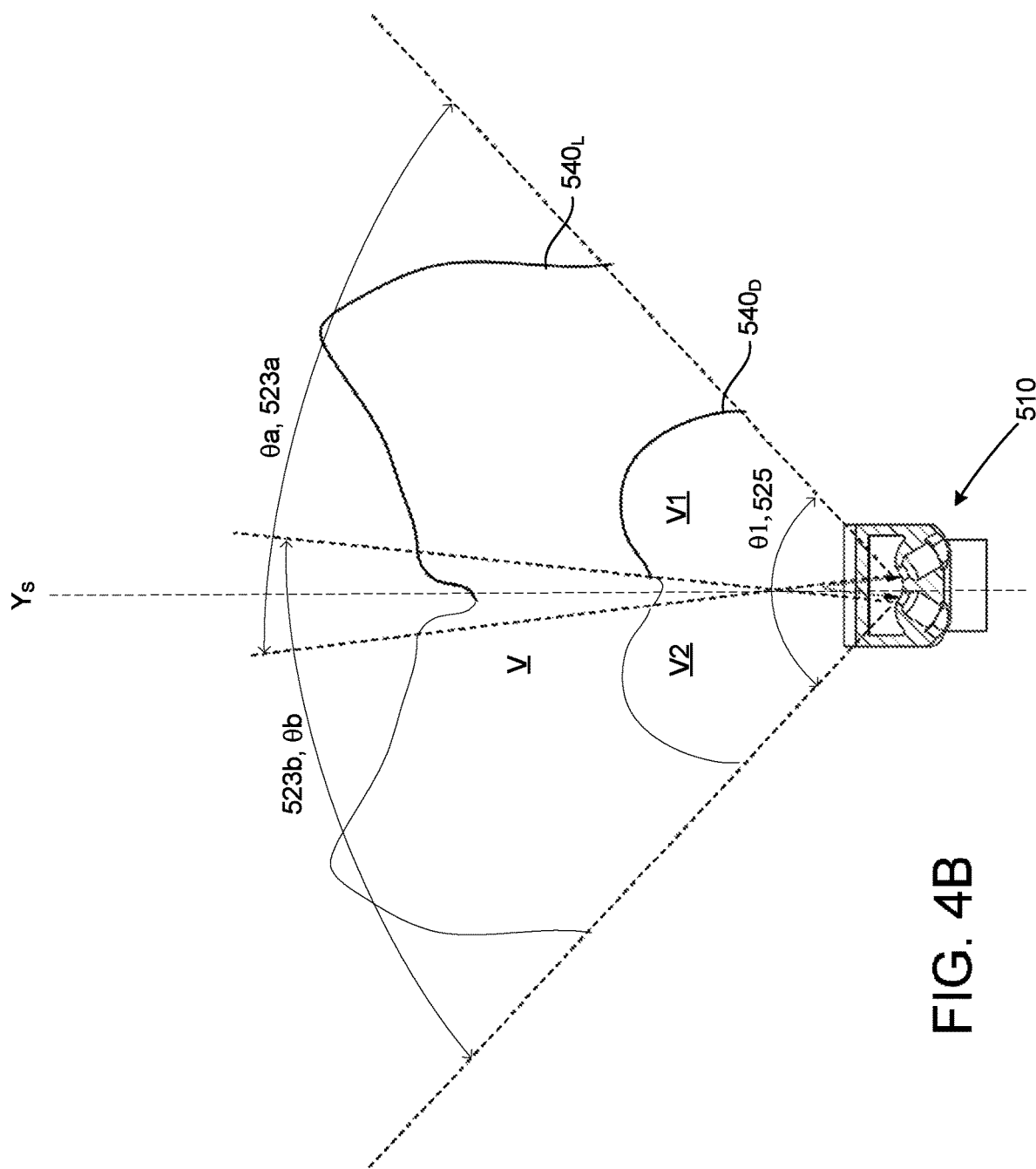
FIG. 4B is a top view of the proximity sensor showing the fields of emission and detection.
Figure 4C:
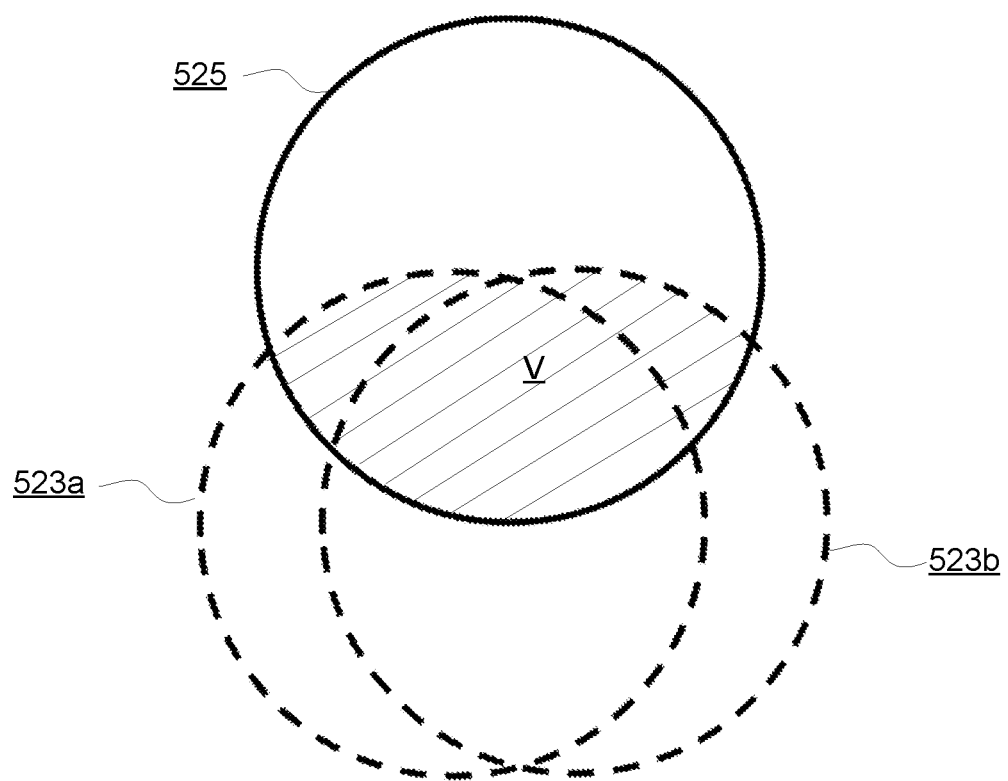
FIGS. 4C-E are front views of the proximity sensor showing the fields of emission and detection.
Figure 4D:
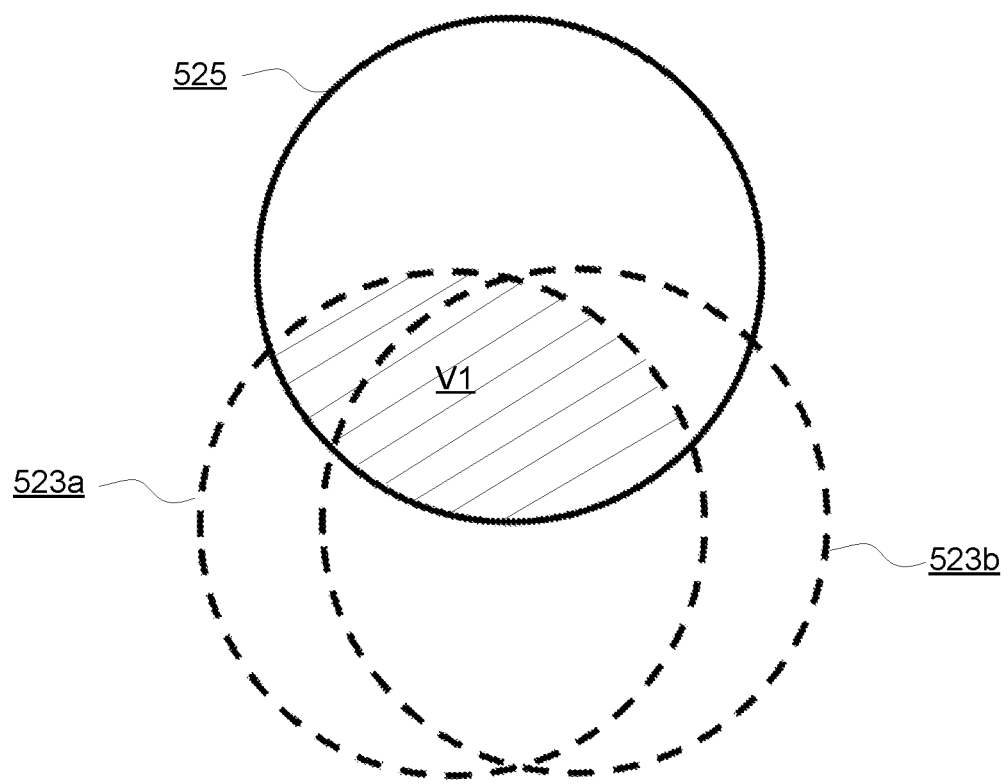
Figure 4E:
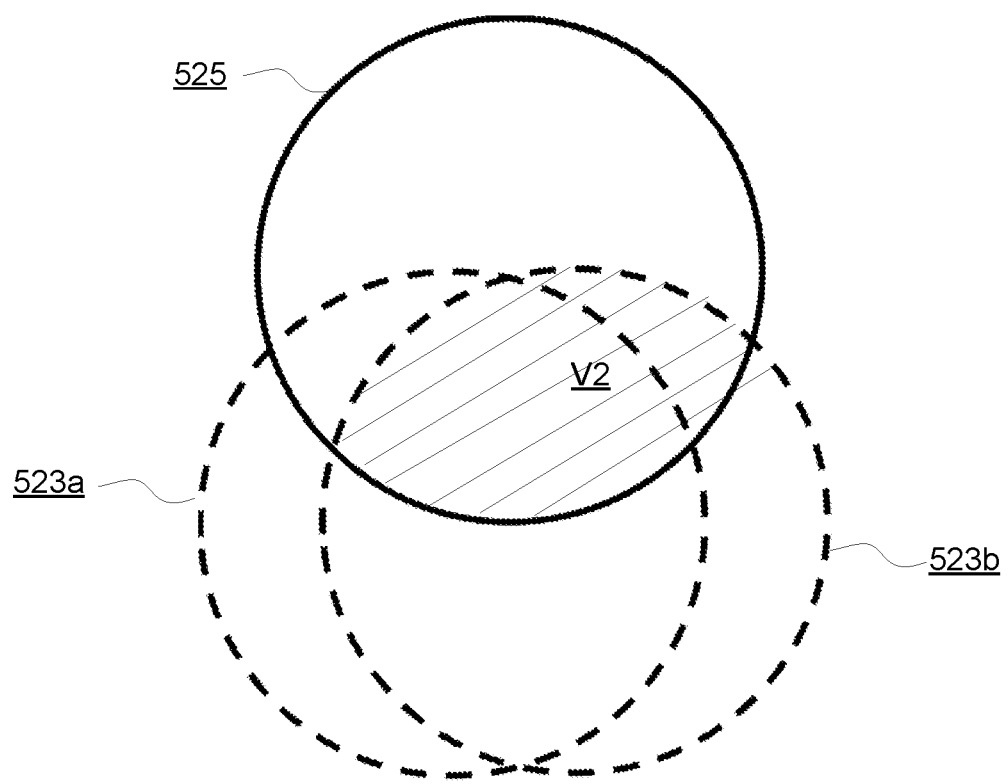

Referring to FIG. 4B, the receiver 524 is arranged to have a field of view 525 that intersects both emission beams 523a,b of the emitters 522a,b. For example, a receiver 524 can have a field of view angle of θ1, where θ1 is approximately 120°. The emitters 522a,b can have beam emission angles θa, θb, respectively. A first beam emission angle θa can be more, less than, or equal to a second beam emission θb, and both the first and second beam emission angles θa and θb are smaller than θ1. In the illustrated example, first and second beam emission angles θa, θb are each approximately 60°. Changing the first and second beam emission angles θa, θb determines where the emission beams 523a,b cross the receiver field of view 525 and therefore determine the closest and farthest distance beyond the perimeter of the robot body 110 that an obstacle is detectable. The first and second beam emission angles θa, θb are shaped by a set of baffles at the opening of the sensor body, including a pin point undercut 526 set an angle of 15 degrees from vertical. This pin point undercut 526 narrows the light emitted from the first small pinpoint baffle opening 519 to a bounded field of view such that the light emitted is a twice-reshaped emission beam 523a,b crossing the receiver field of view 525 at a near and far distance from the perimeter of the robot body 110.

The received signal strength within the first and second bounded detection volumes V1, V2 is stronger if the reflection comes from a lighter reflective material than from a darker material. In FIG. 4B, the first and second bounded detection volumes V1, V2 are bounded by line 540$_D$ which depicts the furthest detection distance of the field of view of the received signals reflected from dark-colored objects. The first and second bounded detection volumes V1, V2 extend to line 540$_L$ when the signal is reflected from light-colored objects (e.g., a wall). The first and second volumes are bounded both by the overlap of the emitter and receiver fields of view and additionally by a threshold signal strength of the receiver 524. As shown, the bounded detection volumes V1, V2 are irregularly shaped due to the overlapping geometry of the fields of view defined by the baffling.

The bounded detection volume V has a furthest detection limit of approximately 55 mm from the periphery of robot 100 when detecting a light-colored post, and a furthest detection limit of about 25 mm from the periphery of the robot 100 (or sensor 510 exit) when detecting a black-colored post.

Figure 3B:
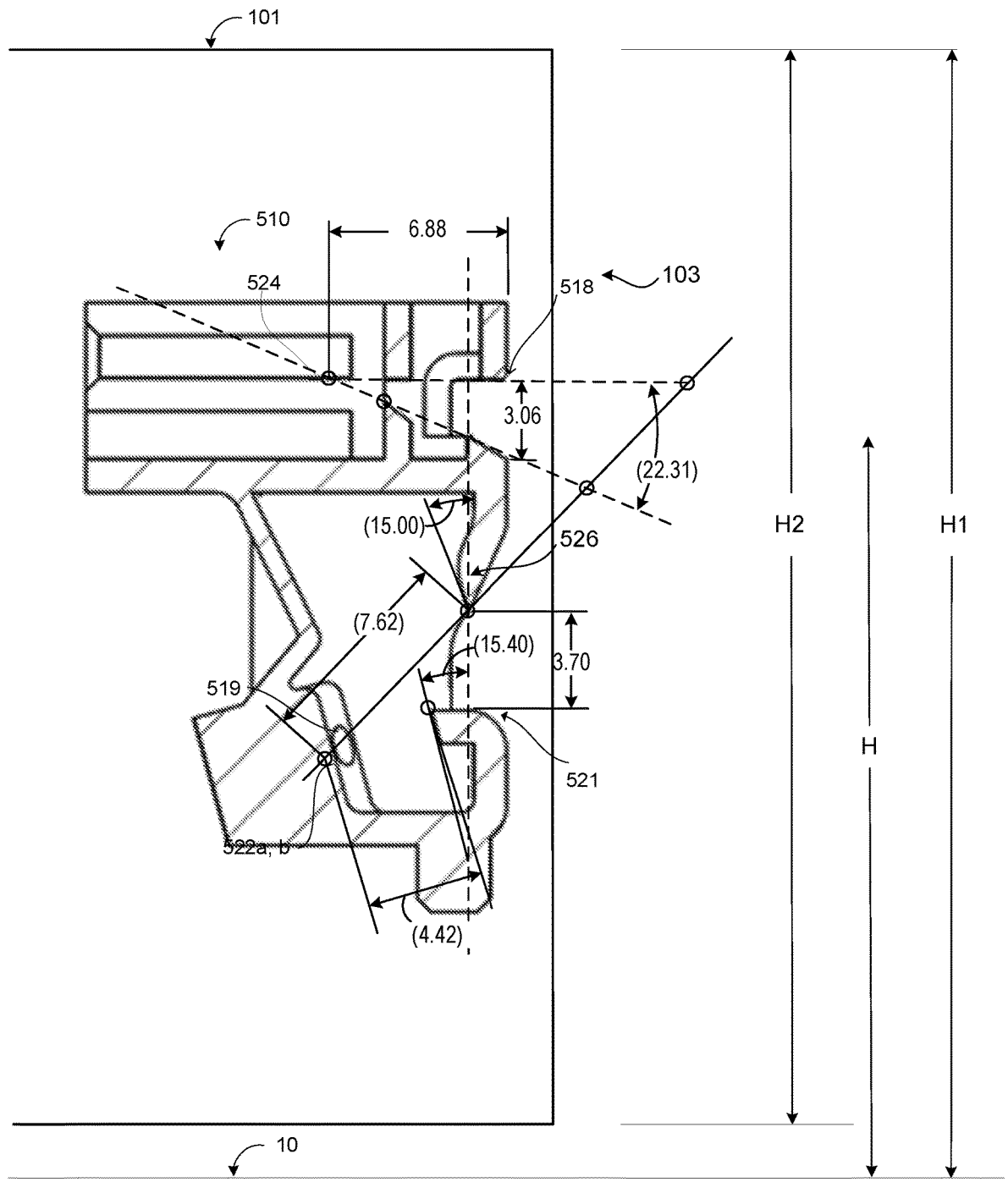
FIG. 3B is a side view of sensor baffle housing for a proximity sensor of the robot in FIG. 1A.

As mentioned above, in order to create the horizontally elongated and downwardly angled clam-shell geometry and place the bounded detection volume at a set distance from the robot 100, the emission fields of view are twice-reshaped by sequential baffles in the sensor body 514. As best seen in FIGS. 4A and 3B, a point source baffle 519 near the source of emission by an LED draws the light from the emitter 522a,b into a point to focus the emission to a controlled beam of light. This point of light would expand outward without bound (as indicated by the light rays emanating within the housing) but an additional baffle 521 at the front edge of the sensor housing defines the boundaries of the emission beam, making it a twice-reshaped emission beam 523. The emission beams 523a,b are twice-reshaped light beams, being shaped first by the round point source baffle 519 and then by the downstream baffle 521 which includes a sharp undercut 526 on the baffle opening. As discussed below, the baffles 517, 518, 519, 521 are arranged so that the intersecting bounded detection volume V is at a determined range of distances beyond the perimeter of the robot body 110.

In some implementations, detection includes receiving reflections of the light received from a first field of view 525, and emitting light from the first emitter 522a along a first emission beam 523a, or second field of view. The method also includes emitting light from the second emitter 522b along a second emission beam 523b or third field of view. The first field of view 525 intersects the first and second emission beams (second and third fields of view) 523a, 523b, where the intersection of the first and second fields of view 525, 523b defines the first volume V1. The intersection of the first and third fields of view 525, 523b defines the second volume V2. The first volume V1 detects an obstacle up to a threshold distance from the sensing reference point (determined by baffling geometry), as does the second volume V2.

Referring in particular to FIGS. 4A-B, the sensor 510 has a longitudinal sensing axis Y$_S$ that bisects the sensor 510 and is arranged along the horizontal, or fore-aft axis, Y of the robot body. The emitters 522a, 522b are symmetrically arranged around this axis Y$_S$, and the receiver 524 is centered on the sensing axis Y$_S$. The sensing axis Y$_S$ bisects the receiver field of field 525 (as shown in FIG. 4B).

The receiver field of view 525 is arranged to detect horizontal emissions parallel to the fore-aft axis Y. The receiver field of view 525 is also angled slightly downwards from the horizontal, in order to intersect the emission beams 523a, 523b. The receiver field of view 525 has a central axis Y524 that is at an angle θ524 from the horizontal. The emission beams 523a, 523b are angled upwards with an upwards directed emission beam axis Y523a, Y523b in order to intersect the receiver field of view 525. To ensure detection, the receiver field of view central axis can be at an angle θ524 between about 0 degrees and about 15 degrees with respect to the sensing axis YS (in this case, the horizontal fore-aft axis Y) and central axes of emission beam axes of Y523a, Y523b at an angle of between 10 and about 20 degrees with respect to the sensing axis YS (in this case, the horizontal fore-aft axis Y).

The bounded detection volume V formed by the overlapping detections volumes V1, V2 is defined by the angle of emission beam axes Y523a, Y523b and vertical angle spread θ523a, θ523b for the emitters 522a,b, and the central axis Y524 and vertical angle θ524 of the receiver 524. The distance L1 from the front of the sensor body 514 to the beginning of the volume of detection defines the closest distance at which an object in front of the sensor housing that can be detected, or the beginning of volume V. The distance L2 from the front of the sensor body 514 to the furthest point of the volume of detection defines the furthest distance at which an object in front of the sensor housing can be detected, or the end of volume V. The type and power level of the emitters and receivers can also affect detection distances L1 and L2.

In some implementations, the sensor 510 uses coded modulation (data over 38 kHz) to distinguish between the first emitter 522a and second emitter 522b and the sensor is therefore a hybrid of time- and frequency-coding. The frequency coding excludes external emission sources and the time-coding distinguishes between emitters. In some implementations, a 38 kHz receiver 524 is used with approximately 90 dB of amplification, using 8 bits of simultaneously coded data. Six bits are used to identify the transmission source as a proximity sensor 510, and two are to identify transmission source as belonging to either the first or second emitter 522a, 522b. In some implementations, the receiver is a photodiode with approximately 80 dB of gain modulated at 1 kHz, using two bits of coded data to identify transmission source as belonging to either the first or second emitter 522a, 522b.

The emitters 522a,b and the receiver 524 may be activated incrementally or sequentially to prevent crosstalk, which occurs when one sensor component receives signals from two sensor components at the same time, thereby causing incorrect (e.g. false positive or false negative) detections of objects. In still other examples using FFT, concurrent emissions have emitters of varying frequencies that prevent erroneous readings. In yet other examples, the emitters 522a,b are modulated in the optical frequency domain and use two different colors of emission for reliable separate detection of the two sources, and the receiver 524 distinguishes the two different wavelengths.

The configuration of sensor 510 described herein in which the emitters 522a,b are activated sequentially allows the robot 100 to see both small dark-colored objects 605 close to the robot and large light-colored objects 610 further from the robot. Rather than activating both emitters at once to illuminate volumes V1 and V2 concurrently, activating only one emitter enables the robot 100 to distinguish objects in V1 and V2 and improve spatial resolution. The geometry of the light due to the sensor body 514 both limits how much power is lost from the bounded detection volume V and enables the bounded detection volume V to be close to the robot to minimize the difference in distance in which the robot 100 senses dark-colored objects 605 and light-colored objects 610. The robot 100 can therefore detect the location and boundaries of a small dark-colored object 605 and the location of a big light-colored object 610 at a longer distance so that the robot 100 can get close to an obstacle before slowing its speed to avoid colliding at top speed.

With the sensor arrangement described, objects in the bounded detection volume V are detected. In some implementations, in order to cover as much of the cleaning surface as possible, variable operating speeds of the robot are used, with a first speed during normal operations with no object detected, and a second speed when an object is detected in the detection zone V. When an object is detected, the robot will slow down such that the second speed is lower than the first speed. For example, the second speed is approximately ⅓ of the first speed. The sequential firing of the emitters 522a,b to illuminate detection zones V1, V2 in combination with the baffling allows the bounded detection volume V to be as close as possible to the robot so that the robot can always detect an object in close proximity, e.g., about to touch the surface of the robot. If a large, light-colored object 610 (e.g., a wall) is detected the robot 100 can change from the first to the second speed when close to the object, thereby improving efficiency.

A further advantage sequential firing of the emitters 522a,b is that the robot 100 can locate the edges of the small dark-colored object 605. This ability allows the robot to navigate around these small dark-colored objects 605. Unlike detection of a large, light-colored object 610, the robot 100 may not change speed. For example, small, dark-colored obstacles 605 frequently encountered by the robot 100 include chair legs. As the robot encounters a chair leg during forward motion, the robot can therefore detect not just a general obstacle, but the size and edges of the chair leg. The robot can therefore determine that there is room to maneuver around the detected small dark-colored obstacle 605, and continue forward motion. As the detection zone V extends to distance 615 laterally from the sides of the robot body 110, the robot can, for example, travel under a chair while detecting chair legs on either side of the robot body 110 since the robot 100 has determined the edges of the chair legs. During a cleaning operation, the robot 100 can therefore advantageously sense the size of obstacles and classify them as objects that can be maneuvered around (e.g., small dark-colored obstacles 605) while also sensing that there is open space through which the robot can turn, permitting the robot to travel under a chair between two chair legs and then turn and travel out from under chair through adjacent chair legs. Since the robot 100 can detect the edges of the objects 605, the robot can sense that it is not entering a narrow passageway in which it cannot turn in place, and does not need to initiate an escape behavior to navigate away from the narrow passageway.

Baffling/Sensor

As previously mentioned, baffling is used to limit the closest and furthest distance from the robot 100 of the bounded detection volume V in which objects induce a sensor response. This baffling improves the definition of the edges of the response volume (e.g., controls the distance of response) and improves the ability of a set of sensors 510a-d to resolve the size and location of an obstacle. Improved spatial resolution allows the sensors to provide more meaningful data to the mapping algorithms employed in navigating the robot. The robot 100 is able to detect small, dark-colored objects by focusing the detection within the bounded detection volume close to the perimeter of the robot body 110 and sequentially emitting light from two emitters to improve the spatial resolution within the bounded detection volume V. The robot is able to generate a map of the cleaning area, and include small dark-colored objects within that map. In some implementations, a camera can be mounted on the robot body 110. The camera can work in tandem with the proximity sensors 510 to build a map of the robot environment. Referring to FIGS. 3B and 4A and as described in detail below, a small aperture 519 near the emitters 522a,b make the emitted light act more like a point source, and sharp undercut baffle edges of the downstream baffle 521 further away from the sensor define the boundaries of the cone, including undercut 526.

In addition to the vertical geometry of the emitters 522a,b relative to the receiver 524, baffling constrains the response of the sensor 510. The baffling limits the fields of view of at least one of the sensor components. The emitter baffling prevents some light from the emitters from being emitted from the sensor body, while the receiver baffling defines the field of view from which reflected light reaches the receiver. Emission beams 523a,b external to the sensor body are cones of emission that have been reduced relative to the full radiation cone emitted by the emitters 522a,b. The sensor body 514 directs the light with baffling pinch points and defines the boundaries of the emission beams 523a,b and receiver field of view 525 to set the near and far distances of detection zone V. The baffle walls may be designed to narrow or expand the emission beams 523a,b, 525 of the sensor components 522a,b, 524.

Referring to FIGS. 3A-C and 4A, the sensor body 514 has a double baffle with five pinch points (two pinch points for the receiver 524 and one for each emitter 522a,b and one shared by the emitters 522a,b). The first emitter pinch point is the opening of emitter apertures 519 which allow emission beams 523 to fill the volume of the sensor body 514 as if from a point source, and the second pinch point for the emitter is downstream baffle edges 521 which create crisp cut offs for sharp emitted light boundaries farther from the emitters 522a,b. Downstream baffle edges 521 include undercut 526 that extends into the housing at angle of approximately 15 degrees. The edges of the resulting emissions are thus sharp and not attenuated, and thereby improve the accuracy of the intersection volumes V1, V2.

Due to this baffling configuration, the emission beams 523*a*, 523*b* are angled upwards with emission beam axes Y523*a*, Y523*b* to subtend a vertical angle spread θ523*a*, θ523*b* of approximately 30°. Angles of 20° to 45° are also possible. The desired angle of emission beam axes Y523*a*, Y523*b* and vertical angle spread θ523*a*, θ523*b* is determined by the dimensions of sensor body 514. In one example, the distance from the emitters 522*a,b* to the lower downstream baffle edge 521 is 4.42 mm and the upper downstream baffle edge 521 is 7.62 mm and the upper and lower downstream baffle edges 521 are separated by 3.7 mm. The downstream baffle edges are separated by 11.13 mm. As shown best in FIG. 3C, the upper downstream baffle edge 521 has an undercut 526 angle of 15° extending into the body of the sensor body 514, which reshapes the upper boundary and defines the shape of the twice-reshaped emission beams 523*a*, 523*b*.

Figure 3C:
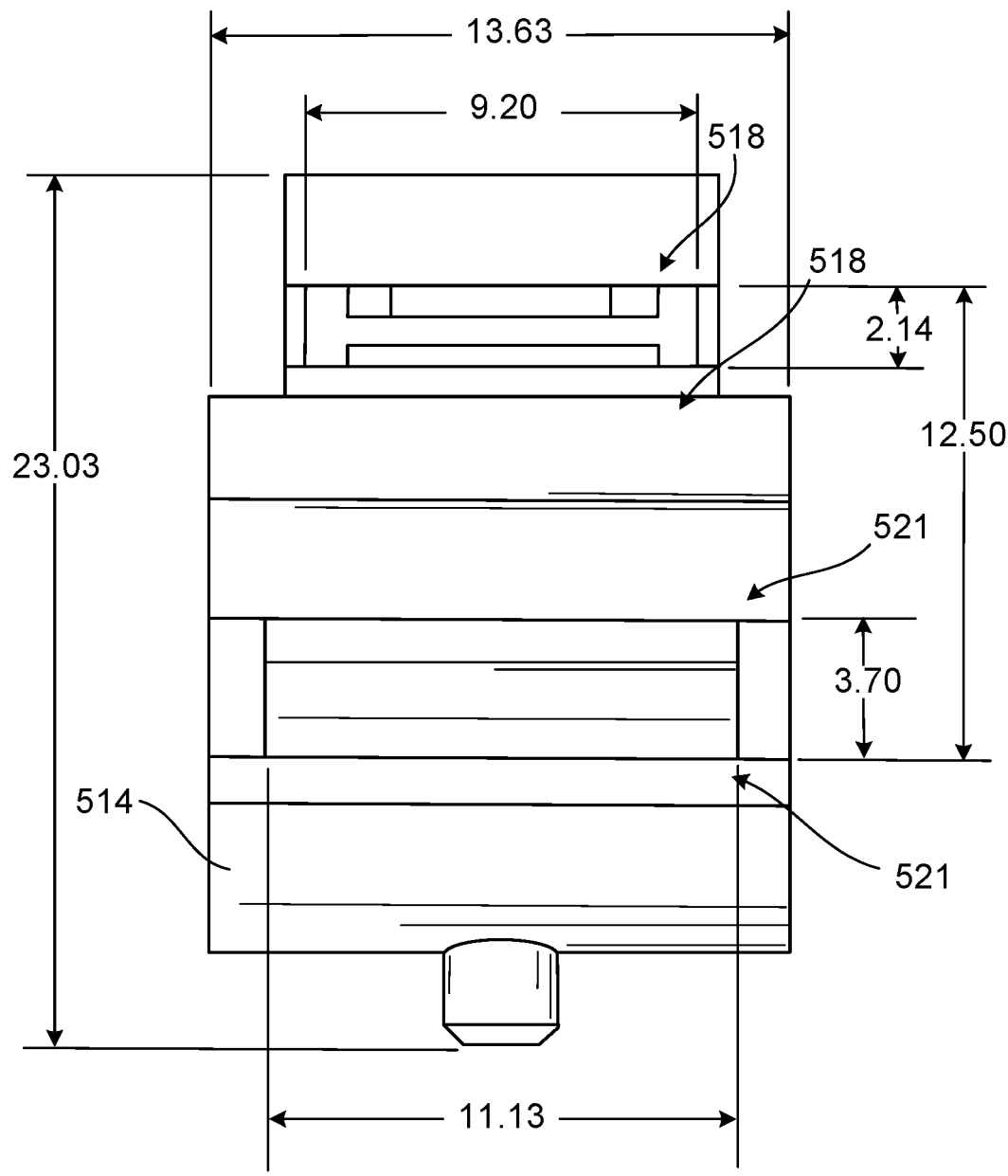
FIG. 3C is a front view of sensor baffle housing for a proximity sensor of the robot in FIG. 1A.

Reducing the separation of the downstream baffle edges 521 reduces the vertical angle spread θ523*a*, θ523*b* and the angle of the emission beam axes Y523*a*, Y523*b*. These changes increase or decrease the size of the emission beams 523*a*, 523*b*, and increase or decrease the strength of the signal emitted from the sensor body 514 relative to the strength of the signal emitted by emitters 522*a,b*. These changes also change the distance from the robot body 110 which the emission beams 523*a*, 523*b* illuminate. As shown in FIG. 3C, in one implementation, downstream baffle edges 521 has a height of 3.70 mm and width of 11.13 mm. Modifying either dimension modifies either the vertical, or horizontal angle spread.

The two upper pinch points include the receiver baffle edges 518 further from the receiver 524, which create crisp cut offs on the received emissions from field of view 525 within the sensor body 514. The receiver baffle edges 518 are chosen to horizontally restrict the received field of view 525 to have an angle θ1 (FIG. 4B) of approximately 120 degrees. The opening of the receiver aperture 517 detects these signals more sharply. The edges of the field of view 525 are thus sharp and improve the accuracy of the V1, V2. As shown in FIGS. 3B-C, in one implementation, receiver baffles edges 518 have a separation height of 3.06 mm and width of 9.2 mm while receiver aperture 517 has a height of 2.14 mm. Changing either dimension modifies either the vertical, or horizontal angle received by the receiver 524.

The receiver field of view 525 has a central axis Y524 that is at an angle θ524 downwards from the horizontal. The receiver field of view 525 is also baffled to subtend a vertical angle spread θ525. Vertical angle spread θ525 can be between 15-30°. In one example, the distance from receiver 524 to the receiver baffle edges 518 is 6.88 mm and the upper and lower receiver baffle edges 518 are separated by 3.06 mm, resulting in a vertical angle spread θ525 of 22.33°. The receiver baffle edges 518 are separated by a width of 9.20 mm.

As shown in FIGS. 1A, 3B, 3C and 7, in one implementation, a robot 100 has a width of 113 mm and height of 86 mm. Sensors 510 including receivers 524 are positioned at locations around the perimeter of the robot body 110 such that two emitters 522*a,b* are positioned side by side and below a receiver 524. The distance from the emitters 522*a,b* to the lower downstream baffle edge 521 is 4.42 mm and the upper downstream baffle edge 521 is 7.62 mm and the upper and lower downstream baffle edges 521 are separated by 3.7 mm. The downstream baffle edges are separated by a width of 11.13 mm. The upper downstream baffle edge 521 has an undercut 526 angle of 15 degrees. The distance from receiver 524 to the receiver baffle edges 518 is 6.88 mm and the upper and lower receiver baffle edges 518 are separated by 3.06 mm, resulting in a vertical angle spread θ525 of 22.33 degrees. The receiver baffle edges 518 are separated by a width of 9.20 mm. The sensors are positioned within the top half of the height of the robot. The combination of these features allows the robot 100 have a bounded detection volume V that is between 2 and 55 mm from the perimeter of the robot.

Modifying the dimensions of the sensor body 514 near the receiver 524 controls the vertical angle spread θ525, field of view axis angle θ524 and the field of view axes Y524. These changes increase or decrease the size of the receiver field of view 525, and increase or decrease the strength of the signal received at the sensor 524 relative to the strength of the signal incident on the housing near the baffled edges 518. These changes also change the distance from the robot body 110 which the receiver field of view 525 illuminates.

The bounded detection volume V formed by the overlapping detections volumes V1, V2 is thus defined by the angle of emission beam axes Y523*a*, Y523*b* and vertical angle spread θ523*a*, θ523*b* for the emitters 522*a,b*, and the central axis Y524 and vertical angle θ524 of the receiver 524. The distance L1 from the front of the sensor body 514 to the beginning of the volume of detection defines the closest distance at which an object in front of the sensor housing can be detected, or the beginning of volume V. The distance L2 from the front of the sensor body 514 to the furthest point of the volume of detection defines the furthest distance at which an object in front of the sensor housing can be detected, or the end of volume V. Various ranges are possible, with L1 between 1 and 10 mm, and L2 between 40 and 70 mm. For example, L1 can be approximately 2 mm, and L2 can be approximately 55 mm. The type and power level of the emitters and receivers can also affect detection distances L1 and L2.

Referring to FIG. 5A, proximity sensors 510 configured as described above can reduce the difference in effective detection distance when sensing relatively light-colored and relatively dark-colored objects. Specifically, dark-colored obstacles 600 that are very optically absorbent in the near IR range (for example, black table legs) can be accurately detected within the detection zone, as can light-colored objects 610. Furthermore, small and/or narrow dark-colored objects are detectable by the sequential emissions such that the robot not only sees these objects but knows relatively where they are positioned for navigating around the obstacle.

Multi Sensor Detection

Figure 5B:
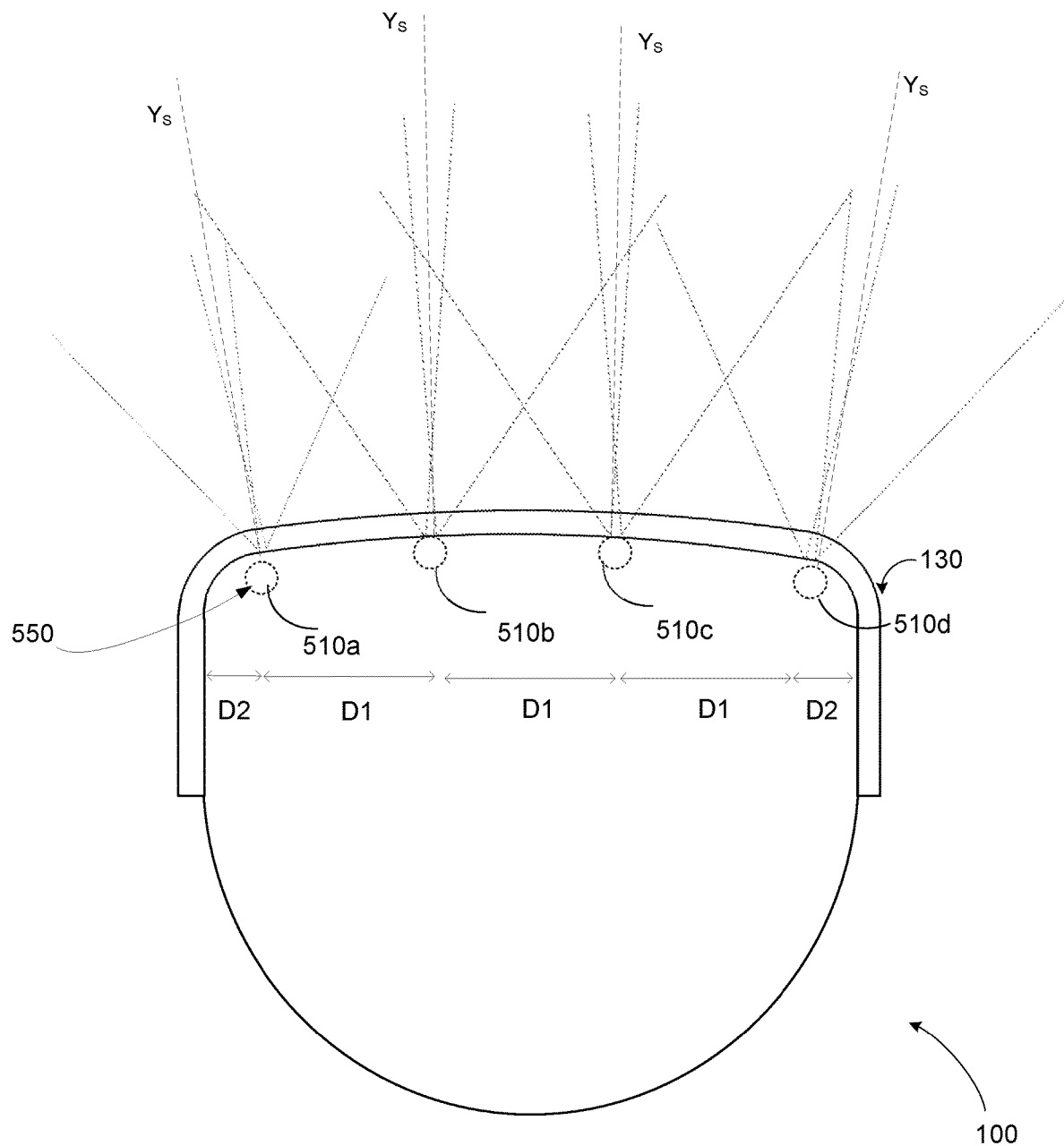

Referring to FIGS. 5A-5B, the bumper 130 defines a shape complimentary to a front periphery of the robot body 110, and an array 550 of proximity sensors 510*a-d* distributed along the front surface in a side-by-side configuration (e.g., along the transverse axis of the robot). Each proximity sensor 51*a-d* has two IR emitters and an infrared detector spaced vertically from the emitters and arranged to have converging corresponding emission and detection fields, resulting in respective bounded detection volumes Va-d. Each proximity sensor in the array corresponds to a predetermined proximity sensor position along the perimeter of the mobile robot 100. Moreover, each proximity sensor is separated by a distance D1 defined between adjacent proximity sensors. The distance D1 and sensor arrangement is chosen so as to have bounded detection volumes V for each sensor touching, or in some cases, overlapping, to provide detection of obstacles across the entire front and laterally to the sides of the robot.

In some examples, the sensor separation distance D1 can be between 15 and 30% of the maximum width of the robot, such as 25%. A lateral separation distance D2 that separates sensors 510a and 510d from the lateral edges of the robot can be different from D1, e.g., more or less than D2. D1 can be between 5-20% of the maximum width of the robot, e.g., approximately 10% of the maximum width of the robot. For example, for a robot of maximum width of 311 mm the sensor separation distance D1 can be between 50-100 mm (e.g., 62 mm), and the lateral separation distance D2 can be between 50-100 mm (e.g., 62.5 mm).

Although a robot configuration in which the proximity sensors are each separated by an equal separation distance D1 is shown, in other implementations the proximity sensors 510a-d can have non-uniform separation distances. The distance between a first and second proximity sensor can be different from a second distance between a second and third proximity sensor, and a third distance between the third and a fourth sensor can be different from, or the same as either other separation distances. Preferably, the sensors are evenly spaced for maximum coverage with the fewest possible number of sensors on the robot body 110 for improved processing, performance, and cost.

In some implementations, at least some of the emission and detection fields of the proximity sensors 510a-d in the array overlap fields of the other proximity sensors along the front surface of the mobile robot 100. This arrangement of sensors 510a-d can allow detection of obstacles not only in front of, but at a distance 615 laterally beyond the side surfaces of the robot (FIG. 5A). For a robot with a square-front profile, this is particularly advantageous as detection of objects laterally beyond the side surface of the robot allows the robot to detect that it has entered a narrow region from which it will have difficulty escaping (e.g., the square-front robot in a narrow passage and unable to rotate). Unlike robots with round profiles, the robot 100 described herein has a square-front profile with corners that corners can catch on obstacle to close to the lateral side of the robot.

Advantages include better path planning, increased efficiency in covering a floor surface due to elimination or reduction in the number of times the robot must back up or emit a signal indicating the robot is stuck, and reduction or elimination in the number of times in which the robot is unable to complete the cleaning process due to be lodged in a narrow passageway.

Detection of both light-colored and dark-colored obstacles at a distance 615 laterally beyond the side surfaces of the robot permits the robot 100 to determine the presence of the obstacle. The controller 151 can then direct the drive system 120 to maneuver away from the obstacle by e.g., reversing direction and backing away from the previous heading until the sensor system 500 no longer detects the obstacle. The robot 100 can also determine if a laterally located object is small or large. The lateral proximity sensor 510a or 510d can detect that an object within the detection fields is large, by e.g., registering its presence at the side of the robot over a determined travel distance (such as 10 cm). The robot can classify the object as a wall, and the controller 151 can direct the drive system 120 to change the drive behavior to wall following, or other behavior. If the lateral proximity sensors 510a or 510d both detect the presence of large objects, the controller can direct the drive system 120 to perform an escape, e.g., stop forward motion, back up until one or both of the walls are no longer detected, and then turn. The lateral proximity sensor 510a or 510d can detect that an object within the detection fields is small, by e.g., registering its presence and then absence at the side of the robot over a determined travel distance (such as 10 cm). Due to the sequential firing of the emitters 522a,b and improved spatial resolution the robot can classify the object as a chair leg, and the controller 151 can direct the drive system 120 to change the drive behavior to small object following, or other behavior.

As shown in FIGS. 5A-B, the front surface of the mobile robot 100 may not be flat, i.e., not parallel to the transverse axis, along its entire width. If complementing the shape of the bumper 130, the sensors 510a-d are thus arranged such that each sensor has a longitudinal sensing axis $Y_S$ that is not parallel to the fore-aft axis, and which can different from the other longitudinal sensing axes $Y_S$ for each of the other sensors. In this example, the two central proximity sensors 510b,c are oriented with their sensing axes $Y_S$ parallel to the fore-aft axis, while the two lateral proximity sensors 510a, 510d are located at the rounded surfaces at the front corners of the robot. The sensing axes $Y_S$ of these two sensors are therefore not parallel with those of the central sensors 510b, 510c. Additionally or alternatively, the different longitudinal sensing axes $Y_S$ for sensors 510a-d can be achieved by rotating the placement of the sensors 510a-d with respect to the front surface of the mobile robot 100. Rather than placing each sensor body flush against the front surface, the sensor body 514 can be angled with respect to the front surface.

Whether or not the sensing axes $Y_S$ of the sensors 510a-d are parallel, each sensor 510a-d in the side-by-side arrangement of the sensor array 550 is arranged to have overlapping bounded detection volumes V.

Figure 6:
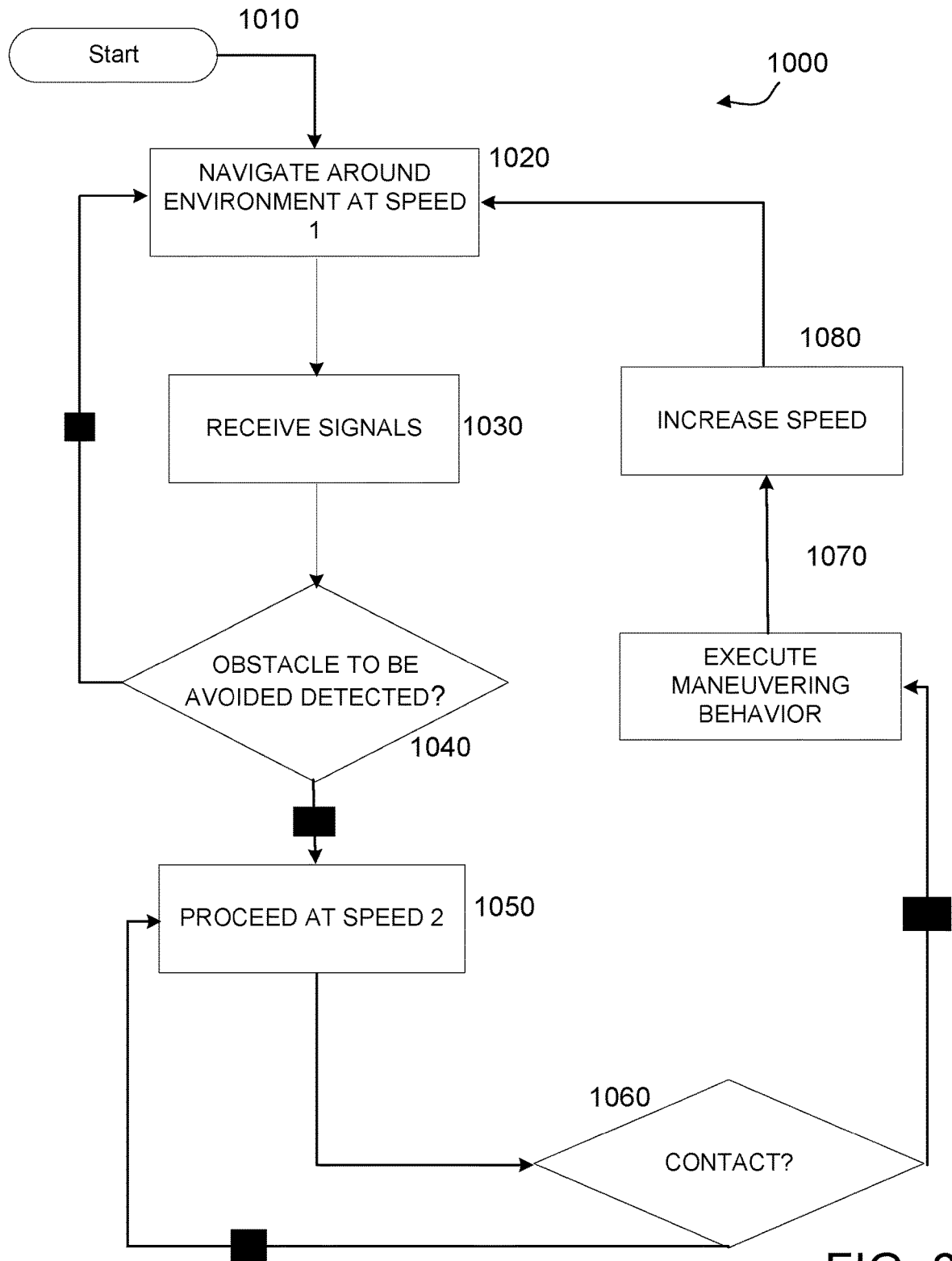
FIG. 6 is a flow chart showing a process implemented by a mobile robot to detect and lightly contact an obstacle.

In the implementations described herein, an advantage is achieved by the receivers with their receiving volumes arranged horizontally. Such a configuration allows the robot 100 to detect peripheral devices, such as a docking station or virtual wall beacons. Combining the function of obstacle detection and peripheral detection decreases the number of parts of the robot, reducing cost and weight of the robot 100. The two functions being combined allows eliminates the need for an omnidirectional receiver extending above the top surface 101 of the robot. The dual purpose receiver embodiment reduces the overall height of the robot. The resulting robot is more streamlined and low profile, and is better able to maneuver under furniture and toe kicks without being limited by a single high point on the robot A method 1000 of maneuvering robot 100 around an environment is shown in FIG. 6. The method starts at step 1010. At step 1020, the robot 1020 is navigating around the environment at its first speed, for example 1 m/s. At step 1030, the robot receives signals from the proximity sensors. At step 1040 the robot determines if an obstacle that is to be avoided is detected within the bounded detection volumes of the sensors. If no object is detected, the robot returns to step 1020 and continues navigating around the environment at the first speed. If an object is detected by the proximity sensors, the robot slows its forward speed to a second speed, typically about ⅓ of the first speed, and proceeds at the second speed, in step 1050. At step 1060 the robot then determines if contact has been made with the detected object as sensed by the bumper. If not, the robot continues moving forward at the second speed to lightly touch the detected object. When contact is detected with the object by the bumper, at step 1070 the robot executes a maneuvering behavior (e.g., wall-following, reversing direction). The robot then increases speed back to the first speed at step 1080, and continues to navigate around the environment, step 1020.

The robot 100 may be designed to interact with a base station or dock located in or near the cleaning area. The base station includes a base defining a docking direction from which the robot may properly dock, and a robot charger housed in the base. An omni-directional beam emitter may be mounted on the base and configured to project a proximity beam laterally around the docking station. Two navigational field emitters are housed in the base and arranged to emit respective, laterally bounded and overlapping fields of emissions of signal beams, respectively. One of the emitted fields defines a lateral field edge aligned with the docking direction and overlapped by the other of the fields. The two navigational field emitters of the base station are positioned to form an angle therebetween of between about 45 and 90 degrees. The fields of emissions of the two navigational field emitters of the base station may be infrared light such as can be detected from detectors 524 of proximity sensors 510. The two navigational field emitters are positioned to form an angle therebetween of between about 45 and 90 degrees.

In some examples, upon termination of a cleaning operation, the robot 100 autonomously initiates a docking mode to maneuver towards the base station and dock with the station. The robot maneuvers towards the base station by detecting and advancing along the lateral field edge of the overlapping fields aligned with the docking direction until docked with the station. In some implementations the robot detects the emissions of the base station with the four proximity sensors 510 evenly spaced across the front of a square-front robot to easily center on and approach the dock in a fluid motion. For example, middle sensors 510b and 510c closest to the midline of the robot detect the emitters of the docking station and move directly into the docking station along the emitted beams of the docking station. The four proximity sensors 510a-d in the side-by-side arrangement of the sensor array 550 allows the robot to identify the two cones of emission or beams that the docking station emits, and identify the overlap between the two beams. This gives a center, or target direction identifying the center of the docking station. The robot 100 can then move forward such that its fore-aft axis remains aligned with the center overlap of the docking station. The robot 100 can dock smoothly, keeping the center beams aligned and absent any back and forth motion of the robot to detect the edges of the dock signals.

The front portion of the robot body may be circular, semi-circular, triangular, reuleaux triangular, spline shaped, or have any other appropriate shape. In these cases, the bumper may have a different geometry than the rectangular shape described herein.

Although the robot 100 has been described as having four proximity sensors 510a-d at the front of the robot, more or fewer proximity sensors can be used at the front of the robot. For example, two, three, or five or more sensors could be used. In addition, the proximity sensors 510 can be positioned at the lateral sides and/or at the rear of the robot. In such a configuration, robot 100 would be able to sense obstacles at a distance 625 around the entire perimeter of the robot, creating an outer zone of detection 620 surrounding the robot body 110.

The outer zone of detection 620 surrounding the robot body 110 enables the robot to detect obstacles in all directions of movement surrounding the robot. An elevated detector above the robot upper surface is therefore not required. With a lower profile due to the absent raised sensor, the robot is still able to receive 360° of signal from its surrounding environment within the outer zone of detection 620.

In some implementations, the robot can be configured so that is docks with the aft region of the robot attached to the docking station. Proximity sensors 510 located at the rear and sides of the robot allow this functionality. In operation, the robot 100 detects and approaches the dock as for forward docking. However, the robot stops when the proximity sensors 510 on the front of the robot detect that it is 10-30 cm away from the docking station. The robot may be able to determine that it is at the distance by the strength of the signal received from the dock. The robot then rotates in place until the proximity sensors 510 on the rear of the robot detect and identify the center overlap region of the emitters of the docking station. The robot then reverses (advances in a rear direction) at lower speed until the aft part of the robot is docked. The rear docking motion can be performed smoothly, without a wiggle motion of the robot or a re-docking procedure to correct alignment between the robot body 110 and the dock.

Figure 7:
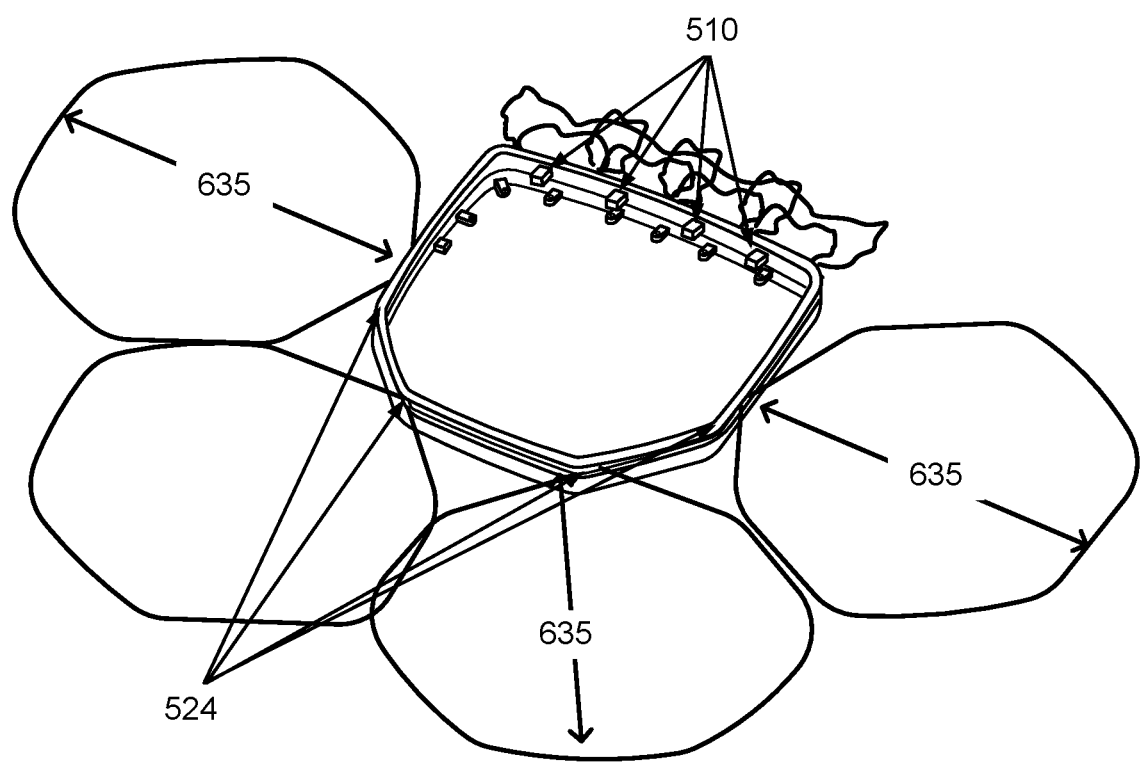
FIG. 7 is as isometric view of the exemplary cleaning robot showing multiple sensors around the perimeter of the robot.

Referring to FIG. 7, for the aft docking embodiment, the proximity sensors 510 located on the back and sides of the robot may be or different from the proximity sensors 510 located on the front of the robot. To save cost, the rear proximity sensors 510 may include receivers only and not emitters as the side and rear receivers receive the signals from the actively signaling docking station. The receivers of the rear proximity sensors 510 are therefore not constrained by bounded detection volumes V due to overlapping emission and detection zones, and thus receive signals from a distance 635 to the sides and rear of the robot body 110.

A computer program can be written in any form of programming language, including compiled or interpreted languages, and it can be deployed in any form, including as a stand-alone program or as a module, component, subroutine, or other unit suitable for use in a computing environment.

Operations associated with controlling the robots described herein can be performed by one or more programmable processors executing one or more computer programs to perform the functions described herein. Control over all or part of the robots described herein can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semi-conductor storage area devices, e.g., EPROM, EEPROM, and flash storage area devices; magnetic disks, e.g., internal hard disks or removable disks; magneto-optical disks; and CD-ROM and DVD-ROM disks.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Accordingly, other embodiments are within the scope of the following claims.

What is claimed is:

1. A proximity sensor system for an autonomous robot, the proximity sensor system comprising:
    a sensor arranged to respond to presence of objects beyond a perimeter of the autonomous robot as the autonomous robot moves over a floor surface, the sensor comprising a receiver and emitters; and
    a controller configured to sequentially enable and disable the emitters,
    wherein the receiver is disposed at a different height than the emitters, and wherein the receiver and the emitters are oriented with different axis orientations with respect to the floor surface, such that a field of view of the receiver intersects with emission beams of the emitters to define a bounded detection volume disposed within a distance of 2 to 55 mm from a periphery of the autonomous robot.

2. The proximity sensor system of claim 1, wherein the controller sequentially enables and disables each of the emitters such that only one of the emitters is enabled at one time.

3. The proximity sensor system of claim 1, wherein the controller is configured to issue a direction-changing or a speed-changing drive command in response to an object interfering with the bounded detection volume.

4. The proximity sensor system of claim 1, wherein the sensor comprises:
    a sensor body; and
    wherein a first of the emitters, a second of the emitters, and the receiver are housed by the sensor body, the sensor configured to emit the emission beams in an upwardly angled direction with respect to the floor surface, the emission beams being generated from light emitted by the first of the emitters and the second of the emitters.

5. The proximity sensor system of claim 4, wherein the receiver is disposed above and between the first of the emitters and the second of the emitters, wherein the emission beams intersect the field of view of the receiver at the distance of 2 to 55 mm from the periphery of the autonomous robot to define the bounded detection volume.

6. The proximity sensor system of claim 4, wherein the first of the emitters and the second of the emitters are spaced from a top surface of the autonomous robot by a distance of less than 35-45% of a height of the autonomous robot, and the receiver is spaced from the top surface of the autonomous robot at a distance of less than 20-35% of the height of the autonomous robot.

7. The proximity sensor system of claim 4, wherein the first of the emitters and the second of the emitters are arranged side by side and the receiver is centered along a midline between the first of the emitters and the second of the emitters.

8. The proximity sensor system of claim 4, wherein an upper bound of the field of view of the receiver is angled downward between 0 and 15 degrees with respect to the floor surface, and a lower bound of the emission beams is angled at 10 to 20 degrees with respect to the floor surface.

9. The proximity sensor system of claim 4, wherein the field of view of the receiver subtends an angle on a plane parallel to the floor surface which is greater than an angle on a plane parallel to the floor surface subtended by an emission beam of the first of the emitters or the second of the emitters.

10. The proximity sensor system of claim 4, wherein upper and lower bounds of the emission beams and upper and lower bounds of the field of view of the receiver are determined by a set of emission baffles and a set of receiver baffles, respectively, of the sensor body.

11. The proximity sensor system of claim 1, comprising two or more sensors, each sensor comprising a receiver and a set of multiple emitters, the two or more sensors being arranged laterally in an array across a front of the autonomous robot.

12. The proximity sensor system of claim 11, wherein two sensors of the two or more sensors are arranged laterally in the array are separated by a distance of less than 25% of a maximum width of the autonomous robot, and a distance from an outermost sensor in the array to a lateral side of the autonomous robot is less than 10% of the maximum width of the autonomous robot.

13. The proximity sensor system of claim 11, wherein bounded detection volumes of at least a first portion of the array are located forward of a front of the autonomous robot with respect to a non-turning drive direction of the autonomous robot, and bounded detection volumes of a second portion of the array partially extend beyond a lateral side of the autonomous robot.

14. The proximity sensor system of claim 1, wherein an intersection of the field of view of the receiver and a first of the emission beams defines a first bounded detection volume and an intersection of the field of view of the receiver and a second of the emission beams defines a second bounded detection volume, the first bounded detection volume overlapping the second bounded detection volume at a minimum distance of 2 millimeters from the autonomous robot.

15. The proximity sensor system of claim 1, wherein the field of view of the receiver includes a first portion that intersects an emission beam of a first of the emitters, the field of view of the receiver includes a second portion that does not intersect the emission beam of the first of the emitters, and the second portion intersects an emission beam of a second of the emitters.

16. The proximity sensor system of claim 15, wherein in response to detecting reflected light when the first of the emitters is enabled and the second of the emitters is not enabled, and not detecting reflected light when the second of the emitters is enabled and the first of the emitters is not enabled, the controller is configured to:
  determine that at least an obstacle is located in a first bounded detection volume defined by an intersection of the field of view of the receiver and the emission beam of the first of the emitters, and no obstacle is located in a second bounded detection volume defined by an intersection of the field of view of the receiver and the emission beam of the second of the emitters, and
  issue a drive command based on determining that at least the obstacle is located in the first bounded detection volume.

17. A proximity sensor system for an autonomous robot, the proximity sensor system comprising:
  a sensor arranged to respond to presence of objects beyond a perimeter of the autonomous robot as the autonomous robot moves over a floor surface, the sensor comprising:
    a sensor body,
    at least a first emitter and a second emitter, and
    a receiver, in which the at least first and second emitters and the receiver are housed by the sensor body, the sensor is configured to emit emission beams in an upwardly angled direction with respect to the floor surface, and the emission beams are generated from light emitted by the first emitter and the second emitter,
  wherein the receiver is disposed at a different height than the first and second emitters, and the receiver and the first and second emitters are oriented with different axis orientations with respect to the floor surface, such that a field of view of the receiver intersects with a first emission beam of the first emitter and a second emission beam of the second emitter to define a bounded detection volume disposed within a distance of 2 mm to 55 mm from a periphery of the autonomous robot.

18. A method of detecting presence of objects beyond a perimeter of an autonomous robot as the autonomous robot moves over a floor surface, the method comprising:
  providing at least one proximity sensor on the autonomous robot, in which the at least one proximity sensor comprises a receiver and emitters, wherein the receiver is disposed at a height different than a height of the emitters;
  orienting the receiver and the emitters with different axis orientations with respect to the floor surface, intersecting a field of view of the receiver with emission beams of the emitters, and defining a bounded detection volume disposed within a distance of 2 to 55 mm from a periphery of the autonomous robot;
  sequentially enabling and disabling the emitters of the at least one proximity sensor; and
  detecting, based on reflected emissions, a presence of one or more objects beyond the perimeter of the autonomous robot.

19. The method of claim 18, wherein sequentially enabling and disabling the emitters of the at least one proximity sensor comprises:
  generating emission beams from light emitted by the emitters of the at least one proximity sensor, and emitting the emission beams in an upwardly angled direction with respect to the floor surface.

20. The method of claim 19, comprising emitting the emission beams in an upwardly angled direction such that a lower bound of the emission beams is angled upward at 10 to 20 degrees with respect to the floor surface.

* * * * *